US012058230B2

(12) United States Patent
Han et al.

(10) Patent No.: US 12,058,230 B2
(45) Date of Patent: Aug. 6, 2024

(54) APPARATUS AND METHOD FOR SIGNALING EXPANSION IN WIRELESS LOCAL AREA NETWORK SYSTEM

(71) Applicant: SAMSUNG ELECTRONICS CO., LTD., Suwon-si (KR)

(72) Inventors: Jonghun Han, Gwacheon-si (KR); Chulho Chung, Yongin-si (KR)

(73) Assignee: SAMSUNG ELECTRONICS CO., LTD., Yongin-si (KR)

(*) Notice: Subject to any disclaimer, the term of this patent is extended or adjusted under 35 U.S.C. 154(b) by 101 days.

(21) Appl. No.: 17/332,012

(22) Filed: May 27, 2021

(65) Prior Publication Data
US 2021/0377368 A1 Dec. 2, 2021

(30) Foreign Application Priority Data

Jun. 2, 2020 (KR) .................. 10-2020-0066702
Sep. 9, 2020 (KR) .................. 10-2020-0115513
Mar. 15, 2021 (KR) .................. 10-2021-0033456

(51) Int. Cl.
H04L 69/08 (2022.01)
H04L 69/18 (2022.01)
H04W 84/12 (2009.01)

(52) U.S. Cl.
CPC ............. H04L 69/08 (2013.01); H04L 69/18 (2013.01); H04L 2212/00 (2013.01); H04W 84/12 (2013.01)

(58) Field of Classification Search
CPC ..... H04L 2212/00; H04L 69/08; H04L 69/18; H04L 69/324; H04W 74/002; H04W 84/12; H04W 4/20
See application file for complete search history.

(56) References Cited

U.S. PATENT DOCUMENTS 10,578,732 B2    3/2020  Jiang. et al.
11,129,163 B2*   9/2021  Ko ..................... H04W 74/002
(Continued)

FOREIGN PATENT DOCUMENTS

EP          3379873        9/2018
WO        2019182267       9/2019
(Continued)

OTHER PUBLICATIONS

Yong et al., "Request To Send (RTS)/Clear To Send (CTS) Frames and Transmission Rules", Apple Inc., U.S. Appl. No. 63/016,066, filed Apr. 27, 2020, pp. 1-34 (Year: 2020).*
(Continued)

Primary Examiner — Shah M Rahman
(74) Attorney, Agent, or Firm — F. CHAU & ASSOCIATES, LLC

(57) ABSTRACT

A method of communicating between a first device (e.g., an AP) and each of with a legacy device and a non-legacy device (e.g., STAs) includes, at the first device, generating a first information field for the legacy device, generating a second information field for the non-legacy device, generating a frame including the first information field and the second information field, and transmitting the frame, wherein the first information field includes a first value by which the legacy device identifies the first information field as valid, wherein the second information field includes a second value by which the legacy device identifies the second information field as invalid.

13 Claims, 25 Drawing Sheets

(56) References Cited

U.S. PATENT DOCUMENTS

| | | | |
|---|---|---|---|
| 2016/0262173 A1 | 9/2016 | Josiam et al. | |
| 2016/0330742 A1* | 11/2016 | Li | H04L 5/0037 |
| 2016/0366701 A1* | 12/2016 | Chu | H04W 74/002 |
| 2017/0094685 A1* | 3/2017 | Noh | H04W 74/0816 |
| 2018/0092117 A1 | 3/2018 | Azizi et al. | |
| 2018/0295221 A1* | 10/2018 | Yu | H04W 72/23 |
| 2019/0115970 A1 | 4/2019 | Vermani et al. | |
| 2019/0124556 A1 | 4/2019 | Verma et al. | |
| 2019/0306920 A1 | 10/2019 | Son et al. | |
| 2020/0045656 A1 | 2/2020 | Verma et al. | |
| 2020/0077273 A1 | 3/2020 | Cherian et al. | |
| 2020/0077350 A1 | 3/2020 | Gidvani et al. | |
| 2020/0137727 A1 | 4/2020 | Min et al. | |
| 2020/0146052 A1* | 5/2020 | Iwai | H04W 74/02 |
| 2020/0154443 A1 | 5/2020 | Patil et al. | |
| 2020/0169841 A1 | 5/2020 | Das et al. | |
| 2020/0177425 A1 | 6/2020 | Chen et al. | |
| 2020/0274662 A1* | 8/2020 | Huang | H04W 72/23 |
| 2020/0328925 A1* | 10/2020 | Yu | H04L 27/2666 |
| 2021/0028917 A1 | 1/2021 | Park et al. | |
| 2021/0168868 A1* | 6/2021 | Jang | H04L 5/0053 |
| 2021/0176763 A1* | 6/2021 | Viger | H04W 74/08 |
| 2021/0227529 A1* | 7/2021 | Chu | H04W 72/23 |
| 2021/0250133 A1 | 8/2021 | Chun et al. | |
| 2021/0266890 A1* | 8/2021 | Chu | H04W 72/51 |
| 2021/0307099 A1* | 9/2021 | Ryu | H04W 76/15 |
| 2021/0329721 A1* | 10/2021 | Kim | H04W 76/15 |
| 2021/0337595 A1* | 10/2021 | Yong | H04W 72/0446 |
| 2021/0392571 A1* | 12/2021 | Kneckt | H04W 48/10 |
| 2022/0124770 A1* | 4/2022 | Yukawa | H04B 7/0413 |
| 2022/0322426 A1* | 10/2022 | Viger | H04L 5/0044 |
| 2022/0329471 A1* | 10/2022 | Lim | H04W 74/0808 |
| 2022/0353847 A1* | 11/2022 | Kim | H04W 72/20 |
| 2022/0369311 A1* | 11/2022 | Nezou | H04W 72/0446 |
| 2023/0006771 A1* | 1/2023 | Yu | H04W 72/0453 |
| 2023/0017257 A1* | 1/2023 | Park | H04L 5/001 |
| 2023/0163808 A1* | 5/2023 | Lou | H04W 74/002 455/101 |
| 2023/0354273 A1* | 11/2023 | Ko | H04L 1/0061 |

FOREIGN PATENT DOCUMENTS

| | | | | |
|---|---|---|---|---|
| WO | 2019194361 | | 10/2019 | |
| WO | WO-2021174337 A1 | * | 9/2021 | G01S 13/003 |

OTHER PUBLICATIONS

Partial European Search Report dated Nov. 12, 2021 for European Patent Application No. 21177250.4 (19 pages).

Ross Jian Yu (Huawei): "Preamble puncture signaling for non-OFDMA transmission", IEEE Draft; 11-20-0401-00-00BE-PREAMBLE-PUNCTURE-SIGNALING-FOR-NON-OFDMA-TRANSMISSION, IEEE-Samentor, Piscataway, NJ USA, vol. 802.11 EHT; 802.11be Mar. 16, 2020 (Mar. 16, 2020), pp. 1-17, XP068167087, Retrieved from the Internet: URL: https://mentor.ieee.org/802.11/dcn/20/11-20-0401-00-00be-preable-puncture-signaling-for-non-ofdma-transmission.pptx.

Extended European Search Report dated Jan. 28, 2022 for European Patent Application No. 21177250.4 (21 pages).

* cited by examiner

FIG. 6

COMMON INFORMATION FIELD

| B0  B3 | B4  B15 | B16 | B17 | B18  B19 | B20  B21 | B22 | B23  B25 |
|---|---|---|---|---|---|---|---|
| Trigger Type | UL Length | More TF | CS Required | UL BW | GI And HE-LTF Type | MU-MIMO (HE-LTF Mode) | Number Of HE-LTF Symbols And Mid-amble Periodicity |
| 4 | 12 | 1 | 1 | 2 | 2 | 1 | 3 |

Bits:

| B26 | B27 | B28  B33 | B34  B35 | B36 | B37  B52 | B53 | B54  B62 |
|---|---|---|---|---|---|---|---|
| UL STBC | LDPC Extra Symbol Segment | AP TX Power | Pre-FEC Padding Factor | PE Disambiguity | UL Spatial Reuse | Doppler | UL HE-SIG-A2 Reserved |
| 1 | 1 | 6 | 2 | 1 | 16 | 1 | 9 |

Bits:

| B63 | |
|---|---|
| Reserved | Trigger Dependent Common Info |
| 1 | variable |

Bits:

FIG. 7

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 8

| UL BW subfield value | Description |
|---|---|
| 0 | 20 MHz |
| 1 | 40 MHz |
| 2 | 80 MHz |
| 3 | 80+80 MHz or 160 MHz |

FIG. 9

USER INFORMATION FIELD

| B0  B11 | B12  B19 | B20 | B21  B24 | B25 | B26  B31 | B32  B38 | B39 | |
|---|---|---|---|---|---|---|---|---|
| AID12 | RU Allocation | UL FEC Coding Type | UL HE-MCS | UL DCM | SS Allocation/ RA-RU Information | UL Target RSSI | Reserved | Trigger Dependent User Info |
| Bits: 12 | 8 | 1 | 4 | 1 | 6 | 7 | 1 | variable |

FIG. 10

| AID12 subfield | Description |
|---|---|
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| 2047-4094 | Reserved |
| 4095 | Start of Padding field |

NOTE 1 – The remaining subfields in the User Info field are reserved when the AID12 subfield is 2046.
NOTE 2 – The remaining subfields of the User Info field are not present when the AID12 subfield is 4095.

FIG. 11

| B7-B1 of the RU Allocation subfield | UL BW subfield | RU size | RU index |
|---|---|---|---|
| 0-8 | 20 MHz, 40 MHz, 80 MHz, 80+80 MHz or 160 MHz | 26 | RU1 to RU9, respectively |
| 9-17 | 40 MHz, 80 MHz, 80+80 MHz or 160 MHz | | RU10 to RU18, respectively |
| 18-36 | 80 MHz, 80+80 MHz or 160 MHz | | RU19 to RU37, respectively |
| 37-40 | 20 MHz, 40 MHz, 80 MHz, 80+80 MHz or 160 MHz | 52 | RU1 to RU4, respectively |
| 41-44 | 40 MHz, 80 MHz, 80+80 MHz or 160 MHz | | RU5 to RU8, respectively |
| 45-52 | 80 MHz, 80+80 MHz or 160 MHz | | RU9 to RU16, respectively |
| 53,54 | 20 MHz, 40 MHz, 80 MHz, 80+80 MHz or 160 MHz | 106 | RU1 and RU2, respectively |
| 55,56 | 40 MHz, 80 MHz, 80+80 MHz or 160 MHz | | RU3 and RU4, respectively |
| 57-60 | 80 MHz, 80+80 MHz or 160 MHz | | RU5 to RU8, respectively |
| 61 | 20 MHz, 40 MHz, 80 MHz, 80+80 MHz or 160 MHz | 242 | RU1 |
| 62 | 40 MHz, 80 MHz, 80+80 MHz or 160 MHz | | RU2 |
| 63,64 | 80 MHz, 80+80 MHz or 160 MHz | | RU3 and RU4, respectively |
| 65 | 40 MHz, 80 MHz, 80+80 MHz or 160 MHz | 484 | RU1 |
| 66 | 80 MHz, 80+80 MHz or 160 MHz | | RU2 |
| 67 | 80 MHz, 80+80 MHz or 160 MHz | 996 | RU1 |
| 68 | 80+80 MHz or 160 MHz | 2x996 | RU1 |

NOTE – If the UL BW subfield indicates 80+80 MHz or 160 MHz, the description indicates the RU index for the Primary 80 MHz or Secondary 80 MHz channel as indicated by B0 of the RU Allocation subfield.

FIG. 23A

| Bits: | 11 | 14 | 2 | 1 | 1 | 3 |
|---|---|---|---|---|---|---|
| | AID11 | Partial BW Info | Feedback Type And Ng | Disambiguation | Codebook Size | Nc |
| | B0  B10 | B11  B24 | B25  B26 | B27 | B28 | B29  B31 |

APPARATUS AND METHOD FOR
SIGNALING EXPANSION IN WIRELESS
LOCAL AREA NETWORK SYSTEM

CROSS-REFERENCE TO RELATED
APPLICATIONS

This application is based on and claims priority under 35 U.S.C. § 119 to Korean Patent Application Nos. 10-2020-0066702, filed on Jun. 2, 2020, 10-2020-0115513, filed on Sep. 9, 2020, and 10-2021-0033456, filed on Mar. 15, 2021, in the Korean Intellectual Property Office, the disclosures of which are incorporated by reference herein in their entireties.

TECHNICAL FIELD

The present disclosure relates generally to wireless communication, and in particular, to an apparatus and method for signaling extension in a Wireless Local Area Network (WLAN) system.

DISCUSSION OF RELATED ART

A WLAN system connects two or more devices to each other, and typically to the Internet, in a local environment such as a home, a building or a campus. Most current WLAN technologies are based on the Institute of Electrical and Electronics Engineers (IEEE) 802.11 standard. The 802.11 standard has evolved into 802.11b, 802.11a, 802.11g, 802.11n, 802.11ac and 802.11ax versions, where recent versions may support a transmission rate of up to 1 Gbyte/s using the current orthogonal frequency-division multiplexing (OFDM) technology. In a typical WLAN, an access point (AP) serves as a gateway to connect user devices such as laptops and smartphones to the Internet. Each user device may communicate with the AP and/or another user device using an assigned set of OFDM subcarriers within an overall frequency band of the WLAN.

In the WLAN standard (version) 802.11ac, data may be simultaneously transmitted to a plurality of users through a multi-user multi-input multi-output (MU-MIMO) technique. However, the WLAN system to which 802.11ac is applied only permits uplink signals to be sent to an AP from one user device at a time, which may result in data communication becoming slow in areas where users are concentrated.

The crowded user problem is addressed in version 802.11ax (also called High Efficiency (HE)), which enables simultaneous uplink communication from multiple user devices to an AP using an Orthogonal Frequency-Division Multiple Access (OFDMA) technique. With OFDMA, user devices are each assigned a Resource Unit (RU), which includes a set of OFDM sub-carriers. The RU is used for both uplink and downlink, so that the WLAN system to which 802.11ax is applied (which also uses MU-MIMO) may effectively support communication in local areas and outdoors crowded with many users.

Furthermore, a next-generation WLAN standard, 802.11be (also called Extremely High Throughput (EHT)), is expected to implement 6 GHz unlicensed frequency band support, bandwidth of up to 320 MHz per channel, introduction of Hybrid Automatic Repeat and ReQuest (HARD), and support up to 16×16 MIMO. With this capability, the next-generation WLAN system is expected to effectively support low latency and ultra-high-speed transmission with performance metrics similar to New Radio (NR) 5G technology.

SUMMARY

Embodiments of the present disclosure provide an apparatus and method for extending signaling while maintaining back compatibility in a Wireless Local Area Network (WLAN) system.

According to one aspect of the present disclosure, a method of communicating between a first device (e.g., an AP) and each of a legacy device and a non-legacy device (e.g., Stations, STAs) includes: generating a first information field for the legacy device; generating a second information field for the non-legacy device; generating a frame including the first information field and the second information field; and transmitting the frame. The first information field includes a first value that allows the first information field to be identified as valid by the legacy device. The second information field includes a second value that allows the second information field to be identified as invalid by the legacy device.

According to another aspect of the present disclosure, a first device that communicates with a legacy device and a non-legacy device includes: a transceiver configured to generate a first information field for the legacy device, generate a second information field for the non-legacy device, generate a frame including the first information field and the second information field, and transmit the frame; and a processor configured to control the transceiver. The first information field includes a first value that allows the first information field to be identified as valid by the legacy device, and the second information field includes a second value that allows the second information field to be identified as invalid by the legacy device.

According to another aspect of the present disclosure, a method of communicating by a non-legacy device with a first device that communicates with a legacy device includes: at the non-legacy device: receiving a frame from the first device; extracting a first information field and a second information field from the frame; ignoring the first information field based on a first value included in the first information field; and identifying first information from the second information field based on a second value included in the second information field. The legacy device may identify the first information field as valid based on the first value, and the legacy device may identify the second information field as invalid based on the second value.

In addition, according to one aspect of the present disclosure, a method of communicating with a legacy device and a non-legacy device includes: generating a first information field for the legacy device; generating a second information field for the non-legacy device; generating a frame including the first information field and the second information field; and transmitting the frame, wherein the generating of the frame includes sequentially arranging the first information field and the second information field in a section in which a variable number of information fields of the frame are arranged.

According to still another aspect of the present disclosure, a receiving device of a WLAN system includes: a transceiver configured to receive a PPDU including a preamble and a payload from a transmitting device, and decode the payload based on the preamble; and a processor configured to control the transceiver, wherein a data field of the payload includes first and second trigger frames that are aggregated in an A-MPDU form to support different first and second standards, respectively, wherein an uplink transmission of the receiving device is triggered by any one of the first and second trigger frames.

According to yet another aspect of the present disclosure, a receiving device of WLAN system includes: a transceiver configured to receive a PPDU including a preamble and a payload from a transmitting device and decode the payload based on the preamble; and a processor configured to control the transceiver, wherein a data field of the payload includes a trigger frame in an S-MPDU form, wherein the trigger frame includes a MAC header and a frame body, wherein the frame body includes a common information field and a plurality of user information fields, wherein the common information field includes common control information applied to a second receiving device supporting a standard different from a standard supported by the receiving device, wherein a first user information field among the plurality of user information fields includes user specific control information applied to the second receiving device, wherein second and third user information fields among the plurality of user information fields are used as a common information field and a user information field applied to the receiving device, respectively.

In addition, according to another aspect of the present disclosure, a receiving device of WLAN system includes: a transceiver configured to receive a PPDU including a preamble and a payload from a transmitting device and decode the payload based on the preamble; and a processor configured to control the transceiver, wherein a data field of the payload includes a trigger frame in an S-MPDU form, wherein the trigger frame includes a MAC header and a frame body, wherein the frame body includes a common information field and a user information field applied to the receiving device, and a common information field, a user information field, and a padding field applied to a second receiving device that supports a standard different from a standard supported by the receiving device, wherein the common information field and the user information field applied to the second receiving device are allocated before the padding field, wherein the common information field and the user information field applied to the receiving device are allocated after the padding field.

In addition, according to another aspect of the present disclosure, a wireless communication method of a receiving device in a WLAN system includes: receiving a PPDU including a preamble and a payload; and decoding the payload based on the preamble, wherein a data field of the payload includes first and second trigger frames that are aggregated in an A-MPDU form to support different first and second standards, respectively, wherein an uplink transmission of the receiving device is triggered by any one of the first and second trigger frames.

In addition, according to another aspect of the present disclosure, a wireless communication method of a first receiving device in a WLAN system includes: receiving a PPDU including a preamble and a payload; and decoding the payload based on the preamble, wherein a data field of the payload includes a trigger frame in an S-MPDU form, wherein the trigger frame includes a MAC header and a frame body, wherein the frame body includes a common information field and a plurality of user information fields, wherein the common information field includes common control information applied to a second receiving device supporting a standard different from a standard supported by the first receiving device, wherein a first user information field among the plurality of user information fields includes user specific control information applied to the second receiving device, wherein the second and third user information fields among the plurality of user information fields are used as a common information field and a user information field applied to the first receiving device, respectively.

In addition, according to another aspect of the present disclosure, a wireless communication method of a receiving device in a WLAN system includes: receiving a PPDU including a preamble and a payload; and decoding the payload based on the preamble, wherein a data field of the payload includes a trigger frame in an S-MPDU form, wherein the trigger frame includes a MAC header and a frame body, wherein the frame body includes a common information field and a user information field applied to the receiving device, and a common information field, a user information field, and a padding field applied to a second receiving device that supports a standard different from a standard supported by the receiving device, wherein the common information field and the user information field applied to the second receiving device are allocated before the padding field, wherein the common information field and the user information field applied to the receiving device are allocated after the padding field.

In addition, according to another aspect of the present disclosure, a non-transitory computer-readable storage medium stores instructions for execution by a processor included in a receiving device of a WLAN system, the method including: receiving a PPDU including a preamble and a payload; and decoding the payload based on the preamble, wherein a data field of the payload includes first and second trigger frames that are aggregated in an A-MPDU form to support different first and second standards, respectively, wherein an uplink transmission of the receiving device is triggered by any one of the first and second trigger frames.

In addition, according to another aspect of the present disclosure, a non-transitory computer-readable storage medium stores instructions for execution by a processor included in a receiving device of a WLAN system, the method including: receiving a PPDU including a preamble and a payload; and decoding the payload based on the preamble, wherein a data field of the payload includes a trigger frame in an S-MPDU form, wherein the trigger frame includes a MAC header and a frame body, wherein the frame body includes a common information field and a plurality of user information fields, wherein the common information field includes common control information applied to a second receiving device supporting a standard different from a standard supported by the receiving device, wherein a first user information field among the plurality of user information fields includes user specific control information applied to the second receiving device, wherein the second and third user information fields among the plurality of user information fields are used as a common information field and a user information field applied to the receiving device, respectively.

In addition, according to another aspect of the present disclosure, a non-transitory computer-readable storage medium stores instructions for execution by a processor included in a receiving device of a WLAN system, the method including: receiving a PPDU including a preamble and a payload; and decoding the payload based on the preamble, wherein a data field of the payload includes a trigger frame in an S-MPDU form, wherein the trigger frame includes a MAC header and a frame body, wherein the frame body includes a common information field and a user information field applied to the receiving device, and a common information field, a user information field, and a padding field applied to a second receiving device that supports a standard different from a standard supported by the receiving device, wherein the common information field and the user information field applied to the second receiving device are allocated before the padding field, wherein the common information field and the user information field applied to the receiving device are allocated after the padding field.

BRIEF DESCRIPTION OF THE DRAWINGS

Embodiments of the inventive concept will be more clearly understood from the following detailed description taken in conjunction with the accompanying drawings in which:

FIG. 6 is a diagram illustrating a structure of a common information field of FIG. 5;

FIG. 7 is a diagram illustrating a trigger type subfield of FIG. 6;

FIG. 8 is a diagram illustrating an Uplink Bandwidth subfield of FIG. 6;

FIG. 9 is a diagram illustrating the structure of a User information field of FIG. 5;

FIG. 10 is a diagram illustrating the association identifier 12 (AID12) subfield of FIG. 9;

FIG. 11 is a diagram illustrating the RU Allocation subfield of FIG. 9;

FIGS. 23A and 23B are diagrams illustrating the structure of the STA information field of FIG. 22;

DETAILED DESCRIPTION OF EMBODIMENTS

Figure 1:
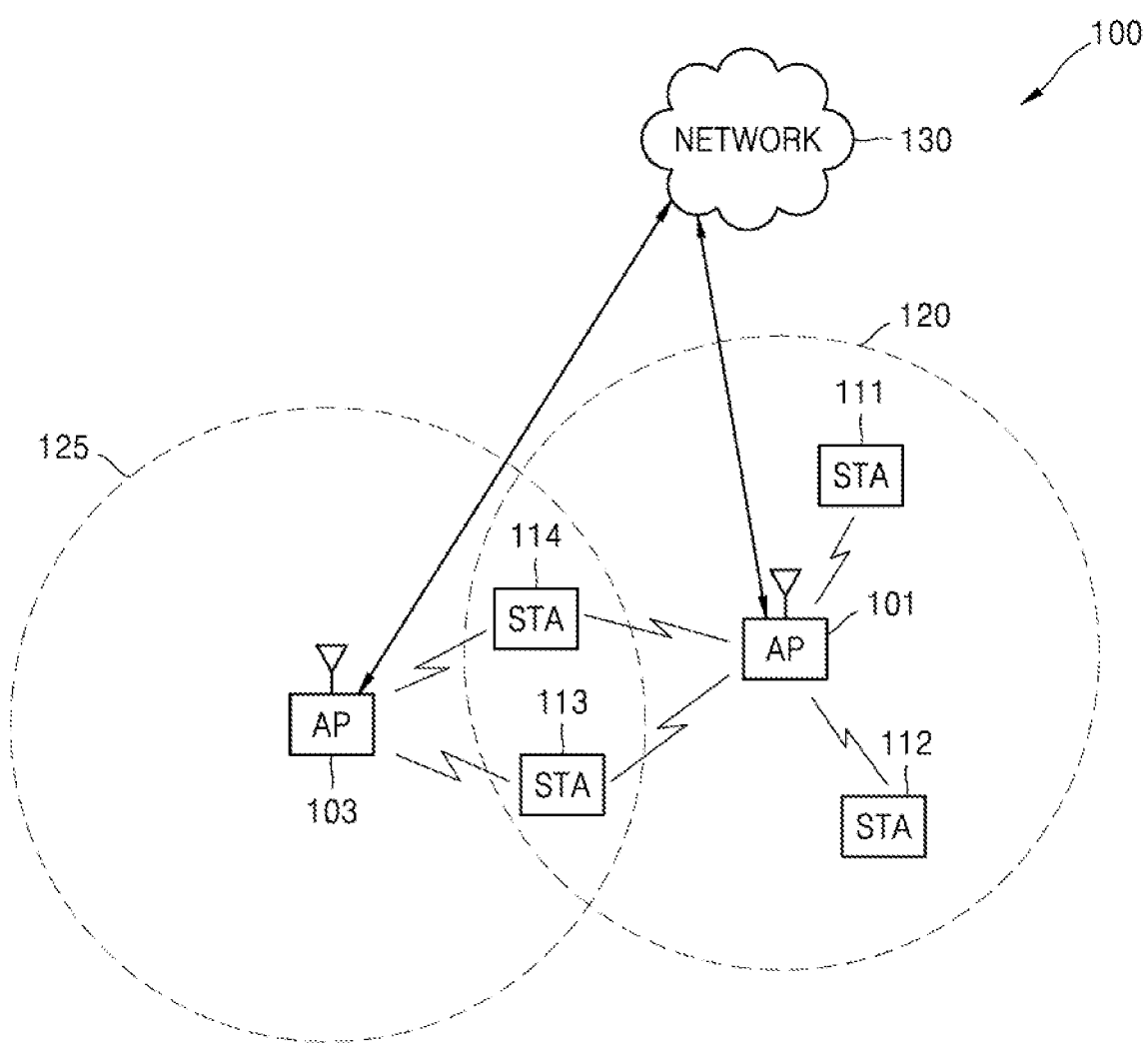
FIG. 1 is a diagram illustrating a wireless local area network (WLAN) system.

Hereinafter, embodiments of the present disclosure will be described in detail with reference to the accompanying drawings in which like reference characters refer to like elements or features.

Terms used herein are for describing embodiments and are not for limiting the inventive concept. Herein, a singular form includes a plural form unless specially described. Described components, processes, operations and/or elements do not exclude presence or addition of one or more other components, processes, operations and/or elements.

Unless otherwise defined, all the terms (including technological and scientific terms) used herein may be used in the meaning that may be commonly understood by those skilled in the art. In addition, terms defined in a commonly used dictionary are not ideologically or excessively interpreted unless specially defined.

In addition, in specifically describing embodiments of the inventive concept, an orthogonal frequency division multiplexing (OFDM) or an OFDM-based wireless communication system, in particular, the IEEE 802.11 standard is to be mainly described. However, the gist of the inventive concept may be slightly modified and applied to other communication systems with a similar technological background and channel type (for example, a cellular communication system such as long term evolution (LTE), LTE-Advanced (LTE-A), new radio (NR), wireless broadband (WiBro), or global system for mobile communication (GSM) or a remote communication system such as Bluetooth or near field communication (NFC)) without remarkably deviating from a range of the inventive concept by those skilled in the art.

Herein, "connects (combines)" and derivatives thereof refer to direct or indirect communication between two or more components that physically contact or do not physically contact. The terms "transmits", "receives", and "communicates" and derivatives thereof include all direct and indirect communication. "Comprises" and/or "comprising" used herein mean inclusion without limit. "Or" is a collective term meaning 'and/or'. "is related to ~" and derivatives thereof mean includes, is included in ~, is connected to ~, implies, is implied in ~, is connected to ~, is combined with ~, may communicate with ~, cooperates with ~, interposes, puts in parallel, is close to ~, is bound to ~, has, has a feature of ~, and has a relation with ~"a controller" means a certain device, system, or a part thereof controlling at least one operation. The controller may be implemented by hardware or a combination of hardware and software and/or firmware. A function related to a specific controller may be locally or remotely concentrated or dispersed.

Herein, a "legacy device" is a device capable of meeting the specifications of an older version of a standard, e.g., a version of the 802.11 standard, but incapable of meeting all the specifications of a later version of the standard. Herein, a "non-legacy device" or, interchangeably, a "next generation" device is a relative term used for a device capable of meeting a newer version of the standard as compared to the legacy device. A "next generation" device, as compared to a legacy device, may be a device capable of meeting the specifications of either an immediately succeeding version, or, at least two succeeding versions.

Herein, a particular 802.11 standard may sometimes be referred to as a "version" of the 802.11 standard. For example, the "802.11ax" standard may sometimes be called the 802.11ax version of the 802.11 standard.

Herein, when an element is first introduced with a name and a label, the element may subsequently be referred to with just the label, for brevity. For example, "the first STA STA1" may subsequently be called just "STA1"; "the third trigger frame Trigger Frame 3" may later be called "Trigger Frame 3"; "the first receiving device HE STA" may later be called "HE STA"; etc.

Figure 2:
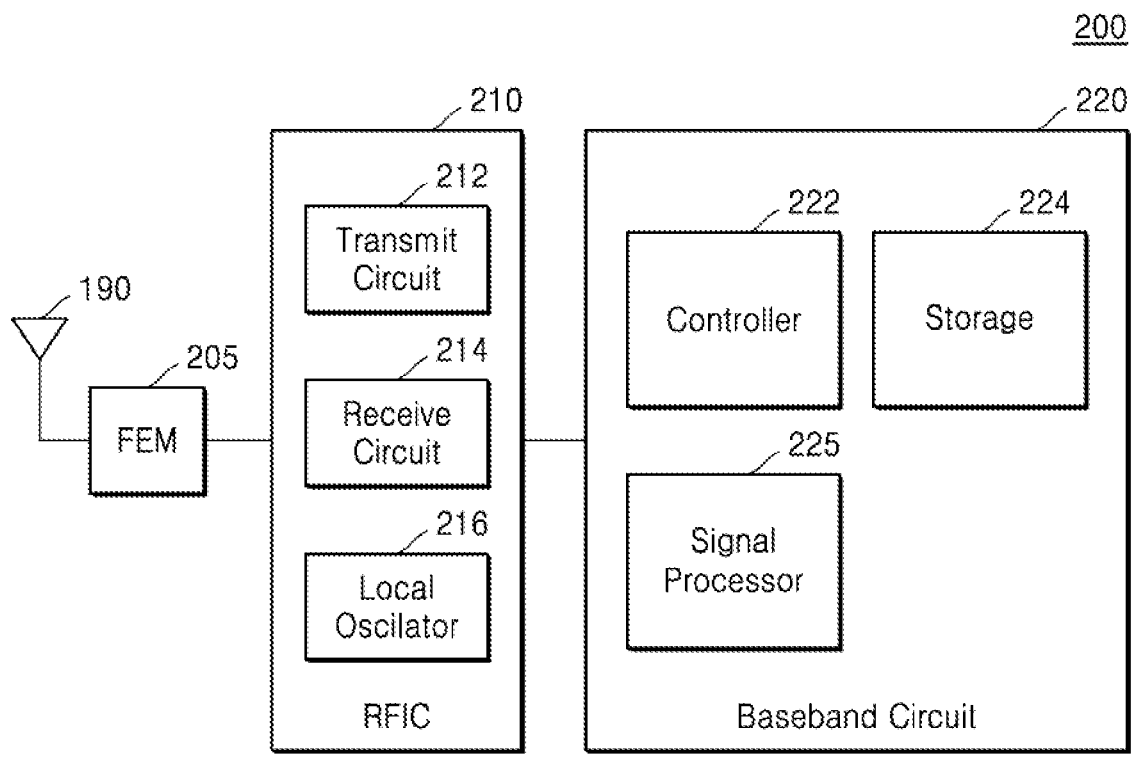
FIG. 2 is a block diagram illustrating a wireless communication device that transmits or receives a PPDU.
Figure 3:
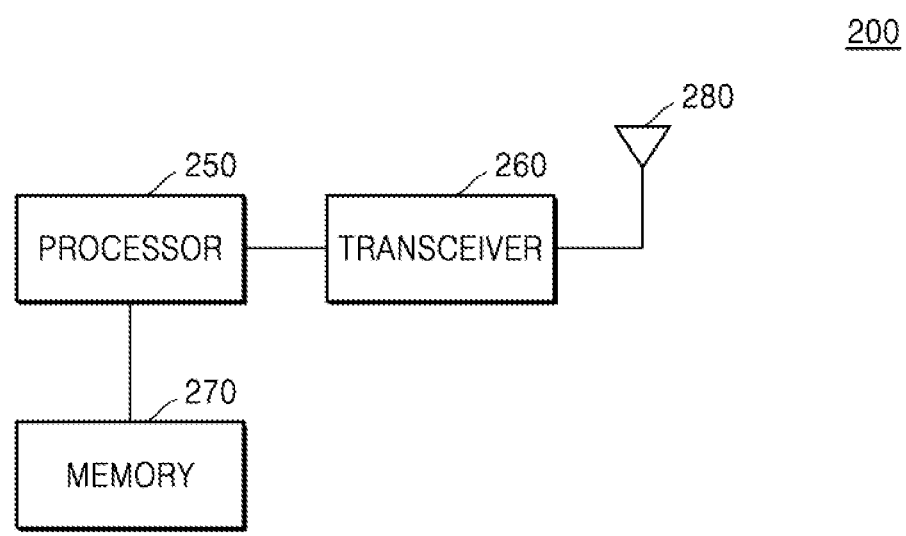
FIG. 3 is a schematic block diagram of the wireless communication device of FIG. 2.

FIG. 1 is a diagram illustrating a wireless local area network (WLAN) system. FIG. 2 is a block diagram illustrating a wireless communication device that transmits or receives a protocol data unit (PPDU). FIG. 3 is a schematic block diagram of the wireless communication device of FIG. 2.

First, as illustrated in FIG. 1, a WLAN system 100 may include access points (AP) 101 and 103.

For example, the APs 101 and 103 may communicate with at least one network 130 such as the Internet, an internet protocol (IP) network, or another data network.

The APs 101 and 103 may provide wireless connection to the network 130 for a plurality of stations (STAs) 111 to 114 in coverage areas 120 and 125 thereof. The APs 101 and 103 may communicate with each other by using wireless fidelity (WiFi) or other WLAN communication technologies. The APs 101 and 103 may communicate with the STAs 111 to 114 by using the WiFi or other WLAN communication technologies. Herein, AP may be referred to a first device and STA may be referred to a second device. Accordingly, the first device may communicate with at least one second device.

For example, in accordance with a network type, other well-known terms such as "a router" and "a gateway" may be used instead of "the AP". In addition, in the WLAN, the AP is provided for a wireless channel. Further, a first AP may act as a STA when the first AP communicates with a second AP.

In addition, in accordance with the network type, "STA" may be used instead of other well-known terms such as "a mobile station", "a subscriber station", "a remote terminal", "user equipment", "a wireless terminal", "a user device", or "a user". For convenience of description, herein, "STA" is used for representing a remote wireless device wirelessly connected to the AP or connected to the wireless channel in the WLAN. Herein, a STA is mainly described as a mobile device (for example, a mobile telephone or a smartphone). However, a STA may be a fixed device (for example, a desktop computer, the AP, a media player, a fixed sensor, or a television set).

Approximate extents of the coverage areas 120 and 125 are marked with dashed lines. Here, the coverage areas 120 and 125 are illustrated as being circular for convenience of illustration. However, each of the coverage areas 120 and 125 related to the APs 101 and 103 may have another shape to which a varying change in wireless environment related to a natural or artificial obstruction is reflected or another irregular shape in accordance with setting of the APs 101 and 103.

As described in detail later, the APs 101 and 103 may include a circuitry and/or a program for managing transmission of an uplink multiuser (ULMU) or a downlink multiuser (DLMU) in the WLAN system 100.

Although FIG. 1 illustrates an example of the WLAN system 100, an embodiment of the inventive concept is not limited thereto. That is, various changes may be made to FIG. 1.

For example, the WLAN system 100 may include an arbitrary number of properly arranged APs and an arbitrary number of STAs. In addition, the AP 101 may directly communicate with an arbitrary number of STAs. The AP 101 may provide wireless broadband access to the plurality of STAs 111 to 114 via the network 130.

Similarly, each of the APs 101 and 103 may directly communicate with the network 130 and may provide wireless broadband access to the plurality of STAs 111 to 114 via the network 130. In addition, the APs 101 and 103 may be configured to connect to a varying external network such as an external telephone network or a data network.

In FIG. 2, a wireless communication device transmitting or receiving the PPDU is illustrated. For example, a wireless communication device 200 of FIG. 2 may be included in a transmitting device (e.g., an AP) or a receiving device (e.g., a STA). That is, the wireless communication device of FIG. 2 may be included in any one of the APs 101 and 103 and the STAs 111 to 114 shown in FIG. 1, and for example, may be applied to a computer, a smartphone, a portable electronic device, a tablet, a wearable device, a sensor used for an Internet of Things (IoT) device, and the like.

For example, the wireless communication device 200 may include an antenna 190, a front-end module (FEM) 205, a Radio Frequency Integrated Circuit (RFIC) 210, and a baseband circuit 220. For example, the FEM 205 and the RFIC 210 may be implemented in one chip as a single component. In this case, the functions of the FEM 205 and the functions of the RFIC 210, which will be described later, may be implemented together in one chip. However, for convenience of explanation, in an embodiment of the present disclosure, an example in which the FEM 205 and the RFIC 210 are separate components is described.

The antenna 190 may be connected to the FEM 205, and may transmit a signal provided from the FEM 205 to another wireless communication device (a terminal or a base station), or may provide a signal received from another wireless communication device to the FEM 205. In addition, the FEM 205 is connected to the antenna 190 to separate the transmission frequency and the reception frequency. That is, the FEM 205 may separate a signal provided from the RFIC 210 for each frequency band and provide the separated signal to the corresponding antenna 190. In addition, the FEM 205 may provide the signal received from the antenna 190 to the RFIC 210.

In this manner, the antenna 190 may transmit a signal frequency-separated by the FEM 205 to free space or may provide a signal wirelessly received from an external source to the FEM 205.

For example, the antenna 190 may include, for example, an array antenna, but is not limited thereto. In addition, the antenna 190 may be composed of one or a plurality of antennas. Accordingly, in some embodiments, the wireless communication device 200 may support a phased array, multiple-input and multiple-output (MIMO), and the like using a plurality of antennas. However, in FIG. 2, for convenience of explanation, one antenna is illustrated.

In addition, the FEM 205 may include an antenna tuner (not shown). In addition, the antenna tuner (not shown) is connected to the antenna 190 to adjust the impedance of the connected antenna 190.

The RFIC 210 may generate an RF signal by performing a frequency up-conversion on a baseband signal provided from the baseband circuit 220. In addition, the RFIC 210 may generate a baseband signal by performing frequency down-conversion on the RF signal provided from the FEM 205.

For example, the RFIC 210 may include a transmit circuit 212 for frequency up-conversion, a receive circuit 214 for frequency down-conversion, and a local oscillator 216.

For example, although not shown in the drawing, the transmit circuit 212 may include a first analog baseband filter, a first mixer, and a power amplifier. In addition, the receive circuit 214 may include a second analog baseband filter, a second mixer, and a low-noise amplifier.

Here, the first analog baseband filter may filter the baseband signal received from the baseband circuit 220 and provide the filtered baseband signal to the first mixer. Further, the first mixer may perform a frequency up-conversion of converting a frequency of a baseband signal from a baseband to a high frequency band through a frequency signal provided by the local oscillator 216. Through such frequency up-conversion, the baseband signal may be provided as an RF signal to a power amplifier, and the power amplifier may power amplify the RF signal and provide the amplified RF signal to the FEM 205.

In addition, the low-noise amplifier may amplify the RF signal provided from the FEM 205 and provide the amplified RF signal to the second mixer. In addition, through the frequency signal provided by the local oscillator 216, the second mixer may perform frequency down-conversion of converting the frequency of the RF signal from a high frequency band to a base band. Through such frequency down conversion, the RF signal may be provided as a baseband signal to a second analog baseband filter, and the second analog baseband filter may filter the baseband signal and provide the filtered baseband signal to the baseband circuit 220.

Meanwhile, the baseband circuit 220 may receive and process a baseband signal from the RFIC 210, or may generate and provide the baseband signal to the RFIC 210.

In addition, the baseband circuit 220 may include a controller 222, a storage 224, and a signal processor 225.

For example, the controller 222 may control overall operations of the RFIC 210 as well as the baseband circuit 220. In addition, the controller 222 may write or read data in the storage 224. For this, the controller 222 may include at least one processor, a microprocessor, or a microcontroller, or may be a part of a processor. More specifically, the controller 222 may include, for example, a Central Processing Unit (CPU), a Digital Signal Processor (DSP), or the like.

The storage 224 may store data such as a basic program, an application program, and setting information for the operation of the wireless communication device 200. For example, the storage 224 may store instructions and/or data related to the controller 222, the signal processor 225, or the RFIC 210. In addition, the storage 224 may store trigger frame format, PPDU format, and RU allocation information.

The storage 224 may include various storage media, e.g., a volatile memory and/or a nonvolatile memory; random access memory (RAM) (e.g., DRAM, PRAM, MRAM, SRAM, etc.); and/or flash memory (e.g., NAND flash memory, NOR flash memory, ONE NAND flash memory, etc.).

The storage 224 may store various processor-executable instructions. In addition, such processor-executable instructions may be executed by the controller 222.

The signal processor 225 may process a baseband signal provided from the RFIC 210 and may process a baseband signal to be provided to the RFIC 210. For example, the signal processor 225 may generate a PPDU using information stored in the storage 224 or decode a PPDU (i.e., the PPDU received from an external wireless communication device through the antenna 190, the FEM 205, and the RFIC 210) received from an external wireless communication device.

For convenience of description, the signal processor 225 will be described based on the components in a receiving path. Analogous components may be applicable to a transmitting path.

For example, the signal processor 225 may include a demodulator, an RxFilter & Cell searcher, and other components.

First, the demodulator may include a channel estimator, a data deallocation unit, an interference whitener, a symbol detector, a channel state information (CSI) generator, a mobility measurement unit, an automatic gain control unit, an automatic frequency control unit, a symbol timing recovery unit, a delay spread estimation unit, a time correlator, and the like, and may perform functions of each component.

Here, the mobility measurement unit is a unit that measures signal quality of a serving cell and/or a neighbor cell to support mobility, and may measure the cell's Received Signal Strength Indicator (RSSI), Reference Signal Received Power (RSRP), Reference Signal Received Quality (RSRQ), Reference Signal (RS)-Signal-to-Interference & Noise Ratio (SINR), and the like.

For example, although not shown in the drawing, the demodulator may be composed of a plurality of sub-demodulators that independently or jointly perform the above-described functions for each de-spreaded signal or a signal of each frequency band in 2G communication system, 3G communication system, 4G communication system, and 5G communication system.

Subsequently, the RxFilter & Cell searcher may include an RxFilter, a cell searcher, a Fast Fourier Transform (FFT) unit, a Time Duplex-Automatic Gain Control (TD-AGC) unit, and a Time Duplex-Automatic Frequency Control (TD-AFC) unit.

Here, the RxFilter (also referred to as Rx Front End) may perform operations such as sampling, interference cancellation, and amplification on the baseband signal received from the RFIC 210. In addition, because the cell searcher includes a Primary Synchronization Signal (PSS) detector and a Secondary Synchronization Signal (SSS) detector, the cell searcher may measure the size and quality of adjacent cell signals.

Meanwhile, other components may include a symbol processor, a channel decoder, and other components in a transmitting path.

Here, the symbol processor may perform channel-deinterleaving, demultiplexing, rate-matching, and the like so that a demodulated signal may be decoded for each channel. In addition, the channel decoder may decode the demodulated signal in a code block unit. In addition, a symbol processor and a channel decoder may include a hybrid automatic repeat request (HARD) processing unit, a turbo decoder, a CRC checker, a viterbi decoder, and a turbo encoder.

In addition, other transmission path parts may include a transmit First-In-First-Out (TX FIFO), an encoder, a scrambler, an interleaver, a constellation mapper, an Inversed Discrete Fourier Transformer (IDFT), a guard interval and windowing insertion module, and the like.

As such, in FIG. 2, the baseband circuit 220 is shown to include the controller 222, the storage 224, and the signal processor 225.

However, in the baseband circuit 220, two or more of the controller 222, the storage 224, and the signal processor 225 may be integrated into one. In addition, the baseband circuit 220 may further include an additional component other than the above-described configuration or may not include some components. Furthermore, the signal processor 225 may further include an additional component other than the above-described configuration or may not include some components.

However, in an embodiment of the present disclosure, for convenience of description, the baseband circuit 220 including the above-described configuration will be described as an example.

In addition, in some embodiments, the controller 222, the storage 224, and the signal processor 225 may be included in one device. In other embodiments, the controller 222, the storage 224, and the signal processor 225 may be distributed and included in different devices (e.g., distributed architecture).

In addition, the RFIC 210 and the baseband circuit 220 may include components well known to those skilled in the art as shown in the drawings. In addition, the components may be executed in a manner well known to those skilled in the art, and may be executed using hardware, firmware, software, or a combination thereof.

However, FIG. 2 illustrates an example of a wireless communication device, and embodiments of the present disclosure are not limited thereto. That is, various changes (addition or deletion of parts) may be made to FIG. 2.

Here, referring to FIG. 3, an example in which the configuration of the wireless communication device 200 of FIG. 2 is partially changed (i.e., simplified) is shown.

For example, the wireless communication device 200 of FIG. 2 may be configured to include a processor 250, a transceiver 260, a memory 270, and an antenna 280, as shown in FIG. 3.

The processor 250 may control overall operations of the transceiver 260 and may write or read data in the memory 270. That is, the processor 250 may be a configuration including, for example, the function of the controller 222 of FIG. 2.

The transceiver 260 may transmit and receive radio signals, and may be controlled by the processor 250. That is, the transceiver 260 may be a component including the functions of the FEM 205, the RFIC 210, and the signal processor 225 of FIG. 2, for example.

Accordingly, when the wireless communication device 200 is included in the transmitting device (that is, when the wireless communication device 200 performs a transmission function), the transceiver 260 may generate a Physical Layer Convergence Protocol (PLCP) PPDU including a preamble and a payload, and transmit the generated PPDU to a receiving device.

On the other hand, when the wireless communication device 200 is included in the receiving device (i.e., when the wireless communication device 200 performs a receiving function), the transceiver 260 may receive a PPDU including a preamble and a payload from a transmitting device. In addition, the transceiver 260 may decode the payload based on the preamble of the received PPDU. That is, the transceiver 260 may decode the preamble of the PPDU through an internal decoder (e.g., the decoder of the signal processor 225 of FIG. 2) and decode the payload of the PPDU based on the decoding result.

The memory 270 may store data such as a basic program, an application program, and setting information for the operation of the wireless communication device 200. Accordingly, the memory 270 may store instructions and/or data related to the processor 250 and the transceiver 260. That is, the memory 270 may be a configuration including the function of the storage 224 of FIG. 2, for example.

The antenna 280 may be connected to the transceiver 260 and may transmit a signal received from the transceiver 260 to another wireless communication device (terminal or base station), or provide a signal received from another wireless communication device to the transceiver 260. That is, the antenna 280 may be a configuration including, for example, the function of the antenna 190 of FIG. 2.

In such a way, in embodiments of the present disclosure, the wireless communication device 200 has the above-described features and configurations, and hereinafter, an HE Trigger Based (TB) PPDU and a trigger frame used in the IEEE standard (i.e., 802.11ax) will be described with reference to FIGS. 4 to 11. Furthermore, based on the trigger frame described with reference to FIGS. 5 to 11, a trigger frame supporting the next generation standard (e.g., the 802.11be standard and subsequent standards) according to an embodiment of the present disclosure will also be described. For example, HE TB PPDUs and trigger frames (including trigger frames according to an embodiment of the present disclosure) described with reference to FIGS. 4 to 11 may be generated by the wireless communication device 200 of FIG. 2 or 3.

Figure 4:
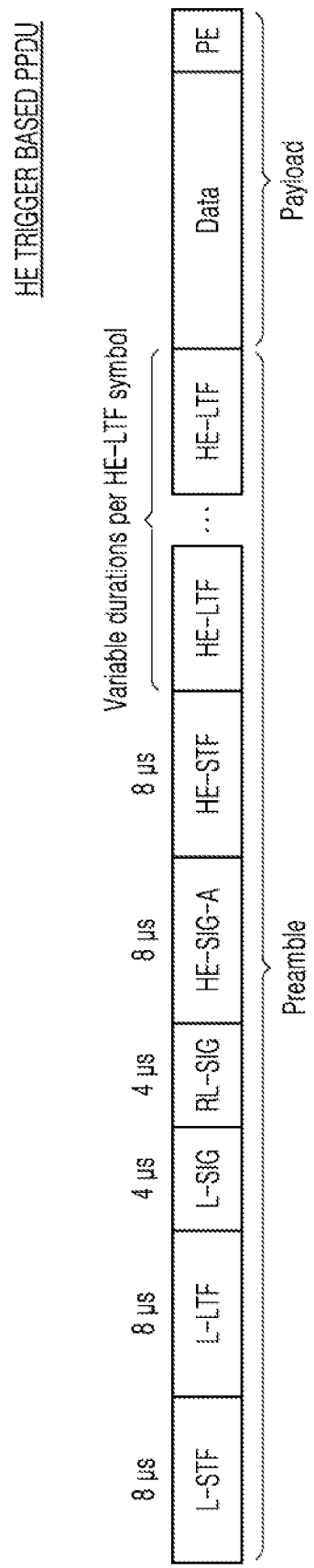
FIG. 4 is a diagram illustrating the structure of an HE Trigger Based (TB) PPDU defined in 802.11ax.
Figure 5:
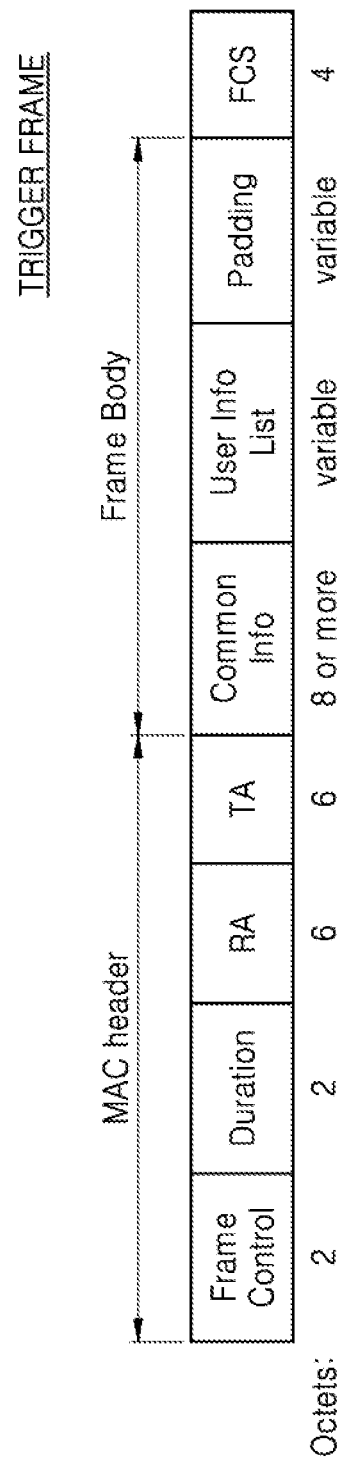
FIG. 5 is a diagram illustrating the structure of a trigger frame defined in 802.11ax.

FIG. 4 is a diagram illustrating the structure of an HE Trigger Based (TB) PPDU defined in 802.11ax. FIG. 5 is a diagram illustrating the structure of a trigger frame defined in 802.11ax. FIG. 6 is a diagram illustrating a structure of a Common information field of FIG. 5. FIG. 7 is a diagram illustrating a Trigger Type subfield of FIG. 6. FIG. 8 is a diagram illustrating an Uplink Bandwidth subfield of FIG. 6. FIG. 9 is a diagram illustrating the structure of a User information field of FIG. 5. FIG. 10 is a diagram illustrating the AID12 subfield of FIG. 9. FIG. 11 is a diagram illustrating the RU Allocation subfield of FIG. 9.

First, referring to FIG. 4, the HE TB PPDU may include a preamble including a plurality of training fields and a plurality of signaling fields, and a payload including a data field and a packet extension.

For example, the HE TB PPDU may include a Legacy-short training field (L-STF) (8 μs length), a Legacy-long training field (L-LTF) (8 μs length), a Legacy-signal (L-SIG) (4 μs length), a Repeated L-SIG (RL-SIG) (4 μs length), a High Efficiency-Signal-A (HE-SIG-A) (8 μs length), a High Efficiency-STF (HE-STF) (8 μs length), a High Efficiency-LTF (HE-LTF), DATA (i.e., a data field), and a PE (i.e., a packet extension field).

Here, a brief description of each field included in the preamble is as follows.

L-STF may include a short training OFDM symbol, and may be used for frame detection, Automatic Gain Control (AGC), diversity detection, and coarse frequency/time synchronization.

L-LTF may include a long training OFDM symbol, and may be used for fine frequency/time synchronization and channel prediction.

L-SIG may be used for transmission of control information and may include information on a data rate and data length. For example, the L-SIG may be repeatedly transmitted, and the format in which the L-SIG is repeated is referred to as RL-SIG.

HE-SIG-A may include control information common to the receiving device, which is as follows.
1) Downlink (DL)/Uplink (UL) indicator
2) BSS color field, which is an identifier of Basic Service Set (BSS)
3) Field indicating the remaining time of the current Transmission Opportunity (TXOP) period
4) Bandwidth field indicating whether 20/40/80/160/80+80 MHz
5) Field indicating the number of symbols of HE-LTF
6) Field indicating the length of HE-LTF and the length of Cyclic Prefix (CP)
7) Field indicating whether an additional OFDM symbol exists for Low Density Parity Check (LDPC) coding
8) Field indicating control information on Packet Extension
9) Field indicating information on the Cyclical Redundancy Check (CRC) field of HE-SIG-A The HE-SIG-A may further include various information in addition to the above-mentioned 1) to 9), and in other examples, may not include some information of 1) to 9)).

The HE-STF may be used to improve automatic gain control estimation in a multiple input multiple output (MIMO) environment or an OFDMA environment.

In addition, HE-LTF may be used to estimate a channel in a MIMO environment or an OFDMA environment.

For example, the size of FFT/Inverse Fast Fourier Transform (IFFT) applied to the field after HE-STF and HE-STF and the size of FFT/IFFT applied to the field before HE-STF may be different from each other. For instance, the size of the FFT/IFFT applied to the HE-STF and the field after the HE-STF may be greater than the size of the FFT/IFFT applied to the field before the HE-STF.

For this reason, a frequency band used by a field before HE-STF and a frequency band used by a field after HE-STF and HE-STF may not accurately match the boundary surface. However, for convenience of explanation, in FIG. 4, the frequency band used by the field before the HE-STF and the frequency band used by the field after the HE-STF and HE-STF are expressed as exactly the same.

Next, each field included in the payload will be briefly described.

The data field may include data for at least one user in a physical layer service data unit (PSDU) for the at least one user.

In the frequency domain of the data field, at least one RU composed of different numbers of tones (i.e., subcarriers) may be arranged based on RU allocation information included in the signaling field of the preamble.

The packet extension has a duration of 4 µs, 8 µs, 12 µs, or 16 µs, and may provide an additional receive processing time at the end of the HE TB PPDU.

In this manner, each field of the preamble and payload of the HE TB PPDU may be configured.

For example, for an uplink (UL) transmission operation to be performed by each of one or more STAs (e.g., non-AP STAs) in the frequency domain, the AP may allocate different frequency resources as uplink transmission resources for each of one or more STAs based on OFDMA. Here, the frequency resource may mean a resource unit (RU), and this frequency resource may be indicated by a trigger frame transmitted from the AP to the STA before the uplink transmission operation.

Accordingly, a trigger frame is used for HE TB PPDU transmission of FIG. 4. Such a trigger frame is shown in FIG. 5, and may be transmitted from an AP to a STA. The trigger frame may include RU allocation information indicating an RU allocated for uplink multiple-user (MU) transmission. The trigger frame may be a Medium Access Control (MAC) frame included in a PPDU. For example, the trigger frame may be included in the data field of the PPDU.

The trigger frame may include a MAC header, a frame body, and a Frame Check Sequence (FCS) field (with 4 octets or more). Here, the MAC header may include a frame control field (2 octets), a duration field (2 octets), a Receiver Address (RA) field (6 octets), and a Transmitter Address (TA) field (6 octets). The frame body may include a common information field Common Info (8 or more octets), a user information list field User Info List (having a plurality of user information fields each including User Info which has 5 or more octets), and a padding field Padding (having variable octets).

Briefly, the Frame Control field includes information on the version of the MAC protocol and other additional control information. The duration field may include time information for setting a Network Allocation Vector (NAV) or information on an identifier of a terminal (e.g., Association ID (AID)). The RA field includes address information of a receiving device (e.g., a STA) of a corresponding trigger frame (this field may be omitted). The TA field may include address information of a device (e.g., AP) that transmits the trigger frame, and the Common Info field may include common control information applied to a receiving device that receives a corresponding trigger frame.

The trigger frame may include User Info fields corresponding to the number of receiving devices that receive the trigger frame. For example, the user information field may be referred to as an "RU allocation field". In addition, the trigger frame may include a padding field and a frame check sequence (FCS) field.

In other examples, some fields of the trigger frame may be omitted, and other fields may be added. In addition, the length of each field may differ from that shown in other examples.

FIG. 6 illustrates an example structure of the common information field Common Info of FIG. 5. Here, the common information field may include various subfields such as a 'Trigger Type' subfield, a 'UL Length' subfield, a 'More TF' subfield, a 'CS Required' subfield, a 'UL BW (Uplink Bandwidth)' subfield, a 'GI And HE-LTF Type' subfield, a 'MU-MIMO HE-LTF mode' subfield, and the like, where each subfield may be a subfield defined in the 802.11ax standard. In other examples, some subfields of the common information field may be omitted, and other subfields may be added. In addition, the length of each of the subfields may differ from that shown.

For example, referring to FIG. 7, a specific table of the Trigger Type subfield of FIG. 6 is shown. As illustrated in FIG. 7, the Trigger Type subfield may indicate the type of the corresponding trigger frame through any one value from 0 to 15. For example, if the value of the Trigger Type subfield is '0', the corresponding trigger frame may indicate that it is a 'basic trigger frame (e.g., a trigger frame supporting the 802.11ax standard)'.

For example, values 8 to 15 of the Trigger Type subfield are reserved values and do not indicate the type of trigger frame. However, in an embodiment of the present disclosure, although not shown in FIG. 7, any one value (e.g., 8) from 8 to 15 of the 'Trigger Type' subfield may be assigned and used as a value indicating a trigger frame supporting a next generation standard, e.g., the 802.11be standard, which is a next generation standard with respect to 802.11ax. Similarly, in an embodiment of the present disclosure, any one of 9 to 15 of the 'Trigger Type' subfield may be assigned and used as a value (e.g., 9) indicating a trigger frame supporting a later non-legacy standard, e.g., a next generation standard "802.11be+" of the 802.11be standard, details of which will be described later.

In some embodiments, the Trigger Type subfield may have a predefined value for the next generation standard. For example, the value '8' of the 'Trigger Type' subfield is not a reserved value as shown in FIG. 7, but may be a predefined value valid for a device based on an arbitrary next-generation standard, and may represent a trigger frame for the next generation standard. Accordingly, a device based on a legacy standard (e.g., 802.11be) may identify that a trigger frame including a 'Trigger Type' subfield having '8' is based on a next-generation standard (e.g., a standard following 802.11be), and may not use information included in the trigger frame.

Referring to FIG. 8, a specific table of a "UL BW" subfield among the above subfields of FIG. 6 is shown. The 'UL BW' subfield may have a value of 0 to 3 indicating corresponding bandwidth information (i.e., total bandwidth information to be used for uplink transmission of HE TB PPDU) included in HE-SIG-A of the HE TB PPDU shown in FIG. 4.

For example, when the value of the 'UL BW' subfield is '0', it may indicate that the total bandwidth to be used for uplink transmission of the HE TB PPDU is '20 MHz'. In addition, when the value of the 'UL BW' subfield is '1', it may indicate that the total bandwidth to be used for uplink transmission of the HE TB PPDU is '40 MHz'.

For example, a trigger frame according to an embodiment of the present disclosure may support an 802.11be standard, which is a next-generation standard with respect to 802.11ax and earlier standards, and a newer standard (e.g., an 802.11be+ standard). Accordingly, although not shown in the drawing, in an embodiment of the present disclosure, the 'UL BW' subfield may have 2 or more bits that indicate a bandwidth (e.g., 320 MHz) other than the bandwidth cases shown in FIG. 8. As noted above, herein, a device that supports a standard that was previously, but not currently, a latest standard (e.g., HE) may be referred to as a legacy device, and a device that supports a standard newer than the legacy device, e.g., current or "next-generation" standards (e.g., EHT or later standards) may be referred to as a non-legacy device or next-generation device.

At least one of the trigger frames according to an embodiment of the present disclosure to be described later will be described on the premise that such characteristics are reflected.

Here, referring to FIG. 9, the structure of the user information field User Info of FIG. 5 is shown.

For example, the user information field may include various subfields such as an 'AID12' subfield, an 'RU Allocation' subfield, a 'UL FEC Coding Type' subfield, a 'UL HE-MCS' subfield, a 'UL DCM' subfield, an 'SS Allocation/RA-RU Information' subfield, a 'UL Target RSSI' subfield, and the like, and each subfield may be a subfield defined in the 802.11ax standard.

In other examples, some subfields of the user information field may be omitted, and other subfields may be added. In addition, the length of each of the subfields may be different from that shown in other examples.

For example, referring to FIG. 10, a specific table of the 'AID12' subfield among the above subfields is shown, and referring to FIG. 11, a specific table of the 'RU Allocation' subfield among the above subfields is shown.

For example, as shown in FIG. 10, the 'AID12' subfield may indicate an identifier of a STA to transmit an uplink. The value of the 'AID12' subfield may indicate different contents for each section.

For example, if the value of the 'AID12' subfield is '0', it may indicate that 'User Info field allocates one or more contiguous RA-RUs for associated STAs'. When the value of the 'AID12' subfield is any one of 1 to 2007, it may indicate that the 'User Info field is addressed to an associated STA of which the AID is equal to the value in the AID subfield'.

Here, 2008 to 2044 and 2047 to 4094 of the values of the 'AID12' subfield are values indicating reserved and do not indicate the identifier of the STA. However, in an embodiment of the present disclosure, although not shown in the drawings, when any one of 2008 to 2044 and 2047 to 4094 (e.g., 2008) is assigned as the value of the 'AID12' subfield, the EHT STA may interpret information following the 'AID12' subfield as an EHT common information field. In this case, the remaining 28 bits excluding the 'AID12' subfield in the user information field may be configured to include the EHT common information field. For example, the newly configured EHT common information field may include a UL BW subfield supporting a bandwidth of 320 MHz.

For example, 28 bits may be insufficient to configure the actual EHT common information field. In this case, the AP may configure a separate user information field in the same manner as described above (i.e., 2008 is allocated to the 'AID12' subfield, and the remaining 28 bits constitute the EHT common information field) and additionally allocate the remaining 28-bits to the EHT STA.

Similarly, in an embodiment of the present disclosure, when another value (e.g., 2010) among 2008 to 2044 and 2047 to 4094 is assigned as the value of the 'AID12' subfield, the EHT STA may interpret information following the 'AID12' subfield as an EHT user information field. In this case, the remaining 28 bits except for the 'AID12' subfield in the user information field may be configured to include the EHT user information field. That is, for example, the first 12 bits of 28 bits may be used as a new AID subfield for indicating the AID of the actual EHT STA, and the remaining 16 bits may be configured to include user information of the EHT STA.

For example, 28 bits may be insufficient to configure the actual EHT user information field. In this case, the AP may configure a separate user information field in the same manner as described above (i.e., 2010 is allocated to the 'AID12' subfield, and the remaining 28 bits constitute the EHT user information field) and additionally allocate the remaining 28-bits to the EHT STA.

At least one of the trigger frames according to an embodiment of the present disclosure to be described later will be described on the premise that such characteristics are reflected.

In some embodiments, the 'AID12' subfield may have a predefined value for the next generation standard. For example, the value '2047' of the 'AID12' subfield is not a reserved value as shown in FIG. 10, and may be a predefined value valid for a device based on any next-generation standard, and may indicate a field for a next-generation standard. Accordingly, a device based on a legacy standard (e.g., 802.11be) may identify that a field including an 'AID12' subfield having '2047' (e.g., a common information field or a user information field) is based on any next-generation standard (e.g., a standard following 802.11be), and may not use the information included in this field.

Similarly, the value '2007' of the 'AID12' subfield is not a value addressed to the STA as shown in FIG. 10, but may be a predefined value valid for a device based on any next-generation standard, and may indicate a field for a next-generation standard.

Meanwhile, among the values of the 'AID12' subfield, 4095 is a value indicating 'Start of Padding field' and indicates the start of the padding field. However, in an embodiment of the present disclosure, although not shown in FIG. 10, if 4095 is assigned as the value of the 'AID12' subfield, the EHT STA (or EHT+ STA (i.e., a STA supporting a standard subsequent to EHT)) may interpret information following the corresponding user information field (i.e., the user information field in which the value of the 'AID12' subfield is '4095') as an EHT common information field and an EHT user information field. In this case, because it is unnecessary to utilize the existing user information field, the EHT common information field and the EHT user information field may be newly redefined without limiting the number of bits.

For example, if desired or necessary, a padding field for EHT STA may be added after the EHT user information field, and the start of the added padding field may be indicated through assignment of a value indicating reserved (e.g., 4094) among values of the 'AID12' subfield.

Meanwhile, as shown in FIG. 11, the 'RU Allocation' subfield may indicate RU information allocated to a STA to transmit an uplink. For example, the 'RU Allocation' subfield may be composed of 8 bits, of which 1 bit may have different uses according to the value of the 'UL BW' subfield of the common information field. For instance, when 'UL BW' is 80+80 MHz or 160 MHz, and 1 bit is '0', the 'RU Allocation' subfield may indicate primary 80 MHz. On the other hand, when 'UL BW' is 80+80 MHz or 160 MHz, and 1 bit is '1', the 'RU Allocation' subfield may indicate secondary 80 MHz. In other cases, the 1 bit may always be set to 0. In addition, the remaining 7 bits of the 'RU Allocation' subfield may be used to designate the RU index together with the 'UL BW' subfield.

For example, a trigger frame according to an embodiment of the present disclosure may support the 802.11be standard and a standard subsequent to 802.11be, which are examples of next generation (non-legacy) standards with respect to 802.11ax. Accordingly, although not shown in FIG. 11, in an embodiment of the present disclosure, the 'RU Allocation' subfield may have 8 or more bits that, in addition to the bandwidth cases shown in FIG. 11, indicate RU allocation information according to a bandwidth such as 320 MHz. At least one of the trigger frames according to an embodiment of the present disclosure to be described later will be described on the premise that such characteristics are reflected.

In this manner, the trigger frame according to an embodiment of the present disclosure may support a next generation standard, e.g., 802.11be, and subsequent standards, and may be configured as described above. Furthermore, the trigger frame according to an embodiment of the present disclosure may trigger uplink transmission of an FD A-PPDU (Frequency Division Aggregated PPDU) composed of a plurality of PPDUs supporting the same or different standards based on the above-described configurations.

For example, embodiments of the present disclosure are applicable not only to the case in which the AP transmits a trigger frame to the STA, but also to a case in which a STA transmits a trigger frame to another STA.

Based on the characteristics of the trigger frame, hereinafter, referring to FIG. 12, a process in which the FD A-PPDU is uplink transmitted by the trigger frame according to an embodiment of the present disclosure will be described.

Figure 12:
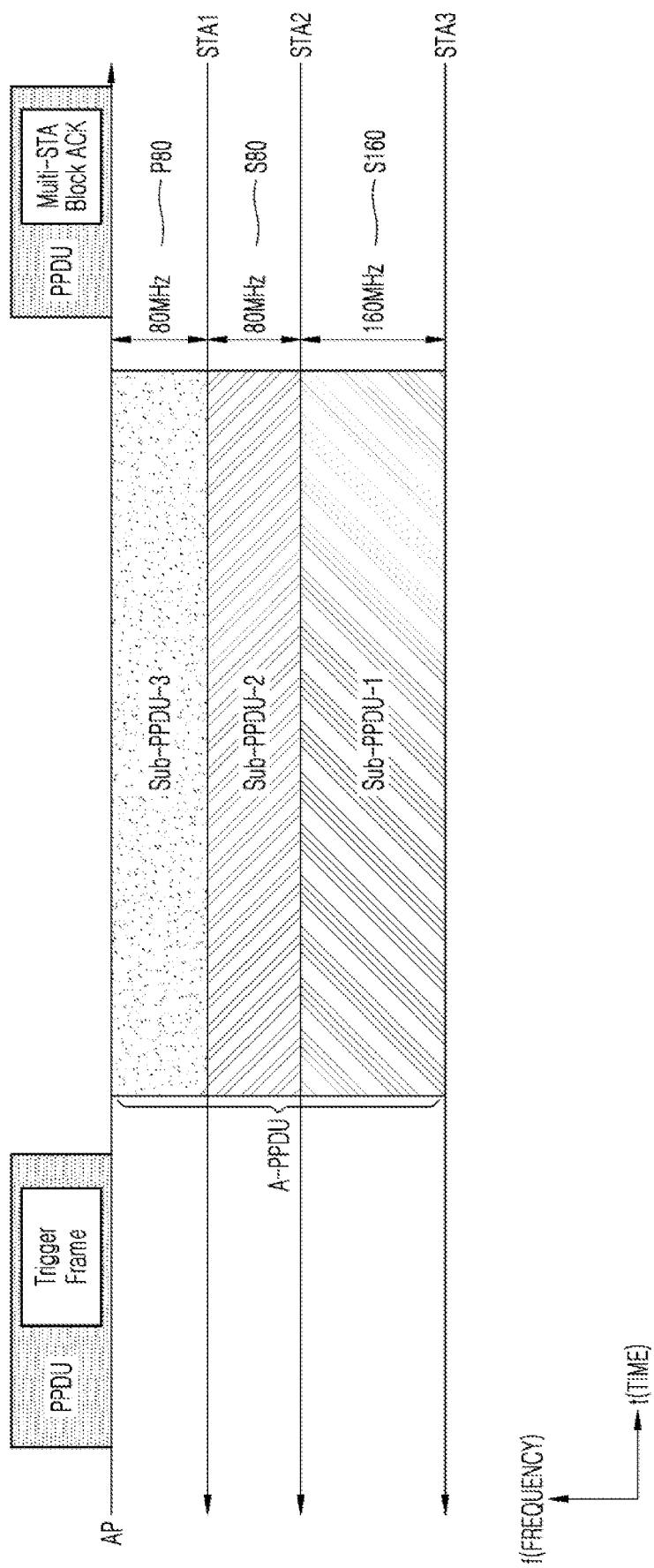
FIG. 12 is a schematic diagram illustrating a process of uplink transmission of an FD A-PPDU by a trigger frame according to an embodiment of the present disclosure.

FIG. 12 is a schematic diagram illustrating a process of uplink transmission of an FD A-PPDU by a trigger frame according to an embodiment of the present disclosure. First, the transmitting device (e.g., AP) may generate a PPDU including a trigger frame according to an embodiment of the present disclosure and transmit the generated PPDU to a plurality of receiving devices, where each may support the same or different standards. STA1, STA2 and STA3 will be used as an example of the receiving devices in the following discussion of FIG. 12.

Here, a trigger frame may include information on STA1 to STA3 for which the transmitting device (e.g., AP) intends to trigger uplink transmission and allocation information of an RU to be used by the corresponding receiving devices when transmitting signals uplink.

After receiving a trigger frame, each of STA1 to STA3 may check whether an RU for uplink transmission is allocated to itself. When uplink transmission is assigned to any of STA1-STA3, uplink transmission may be performed using an RU allocated to that STA based on information included in the trigger frame. The PPDU type used for such uplink transmission may be TB PPDU, and the TB PPDUs (Sub-PPDU-1 to 3) uplink transmitted by STA1 to STA3 respectively may be different from each other according to supported standards. Furthermore, STA1 to STA3 may transmit TB PPDUs (Sub-PPDU-1 to 3) in the form of an FD A-PPDU for TB PPDUs (Sub-PPDU-1 to 3) supporting different standards to be transmitted uplink simultaneously on the time axis without overlapping each other on the frequency axis.

For instance, a trigger frame according to an embodiment of the present disclosure has a configuration capable of simultaneously supporting different standards (e.g., 802.11ax standard, 802.11be standard, and later standards) so that TB PPDUs supporting different standards (Sub-PPDU-1 to 3) may be transmitted in the form of FD A-PPDU.

In addition, when the uplink transmission of each of the receiving devices (STA1 to STA3) is completed, regarding successfully received uplink transmissions, the transmitting device AP may transmit a PPDU including a Block Acknowledgement (Ack) frame (Multi-STA Block ACK) to receiving devices (at least one of STA1 to STA3) that perform the corresponding transmission.

In this manner, FD A-PPDU is uplink transmitted by a trigger frame according to an embodiment of the present disclosure, and in the following, with reference to FIGS. 13 to 16, various examples of trigger frames according to an embodiment of the present disclosure will be described in detail.

Figure 13:
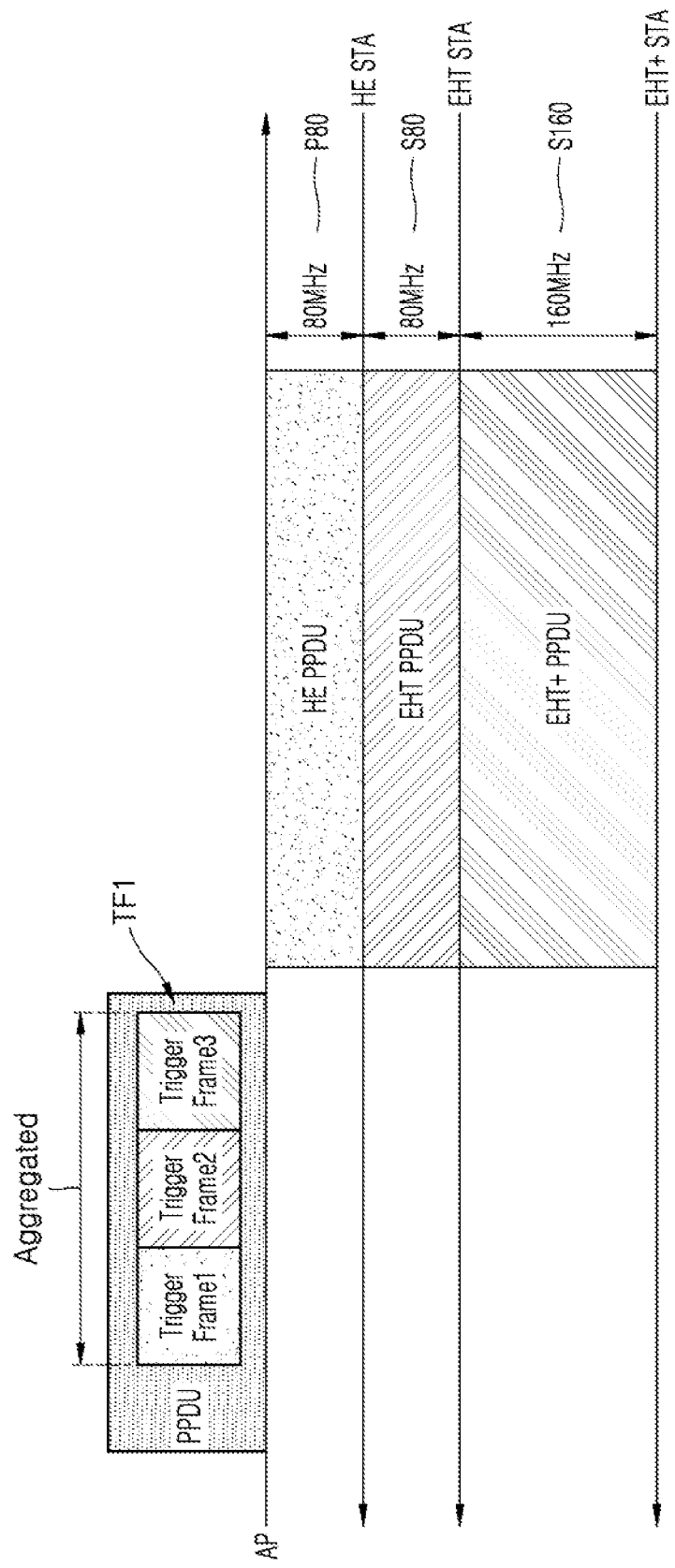
FIG. 13 is a diagram illustrating an example of a trigger frame according to an embodiment of the present disclosure.
Figure 14:
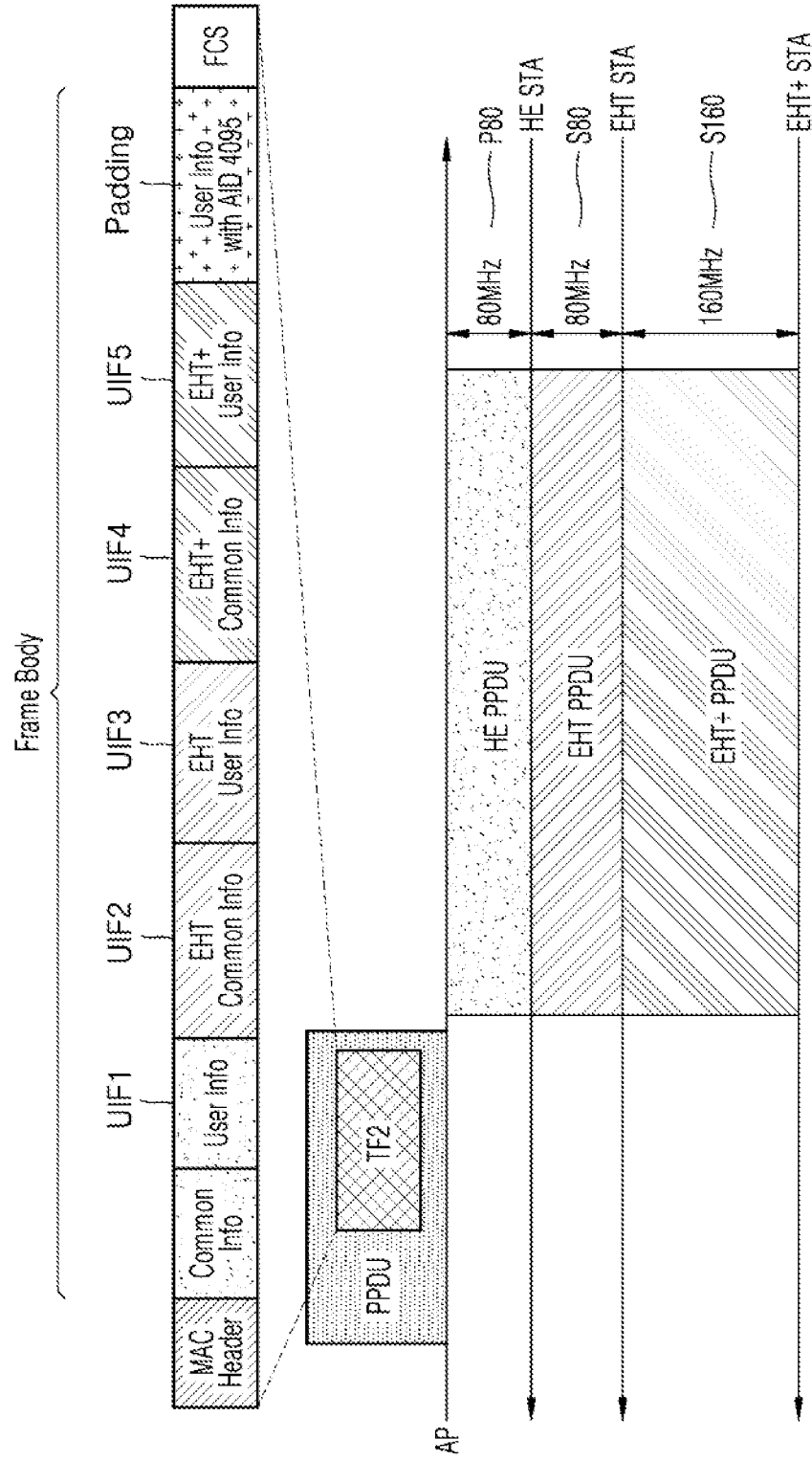
FIG. 14 is a diagram illustrating another example of a trigger frame according to an embodiment of the present disclosure.
Figure 15:
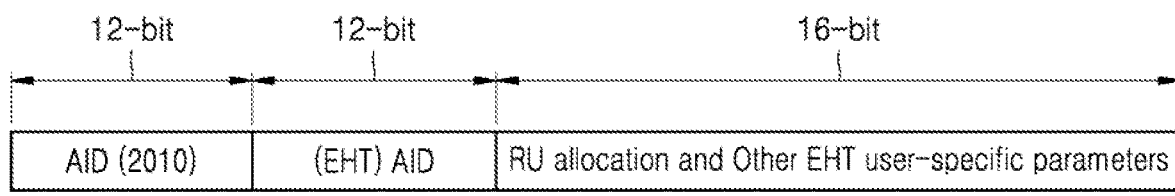
FIG. 15 is a diagram illustrating an example structure of the EHT User information field of FIG. 14.
Figure 16:
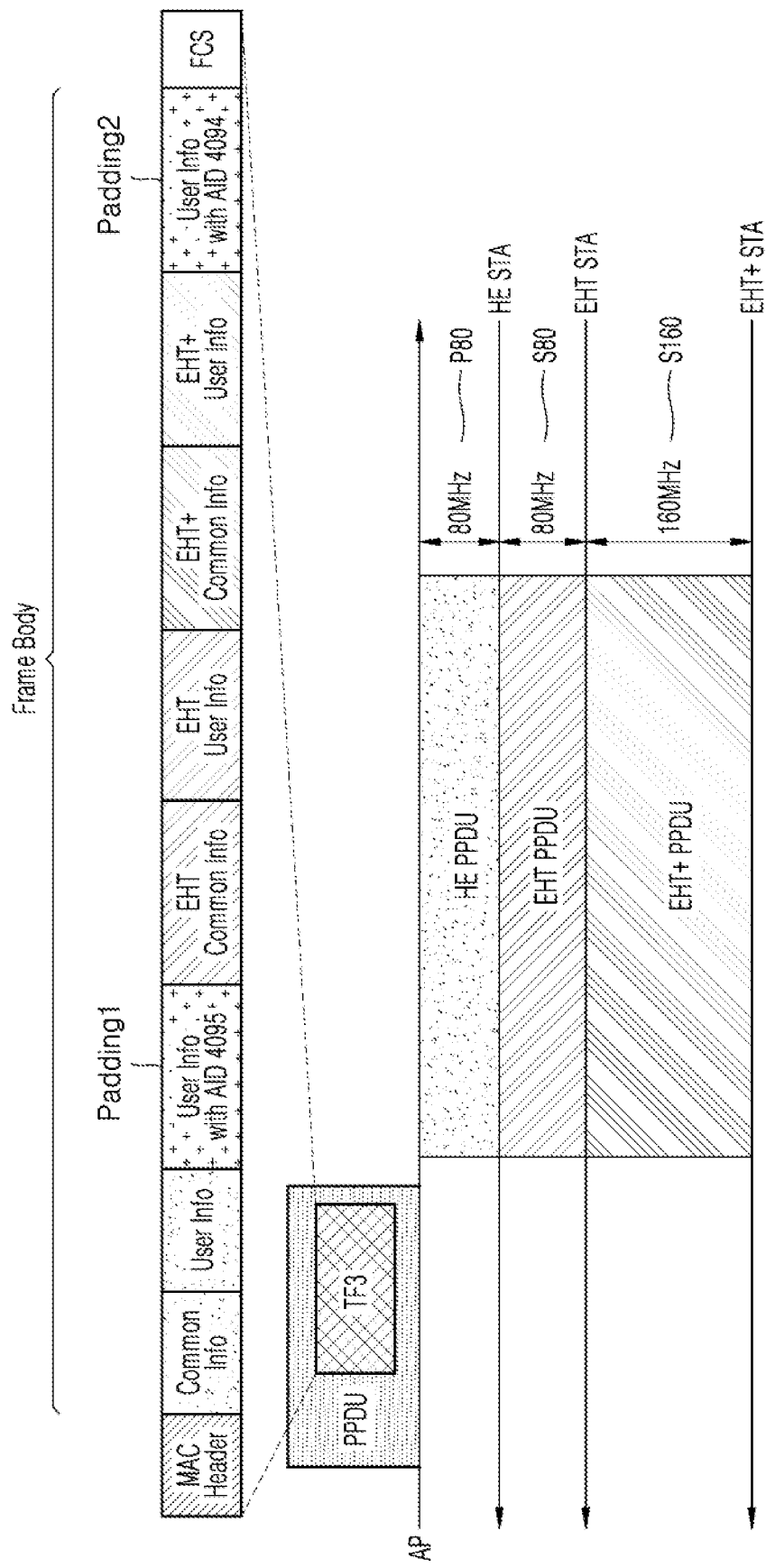
FIG. 16 is a diagram illustrating another example of a trigger frame according to an embodiment of the present disclosure.

FIG. 13 is a diagram illustrating an example of a trigger frame according to an embodiment of the present disclosure. FIG. 14 is a diagram illustrating another example of a trigger frame according to an embodiment of the present disclosure. FIG. 15 is a diagram illustrating an example structure of the EHT User information field of FIG. 14. FIG. 16 is a diagram illustrating another example of a trigger frame according to an embodiment of the present disclosure.

For example, trigger frames described with reference to FIGS. 13 to 16 may be generated by the wireless communication device 200 illustrated in FIGS. 2 and 3. And, for convenience of explanation, in FIGS. 13 to 16, it is assumed and described that three receiving devices (e.g., HE (802.11ax) STA generating HE TB PPDUs, EHT (802.11be)

STA generating EHT TB PPDUs, EHT+ (the standard following 802.11be) STA generating EHT+ TB PPDUs) receive the trigger frame, and 80 MHz, 80 MHz, and 160 MHz are allocated to the three receiving devices (HE STA, EHT STA, and EHT+ STA), respectively (e.g., Primary 80 MHz allocation to HE STA, Secondary 80 MHz allocation to EHT STA, and Secondary 160 MHz allocation to EHT+ STA).

First, referring to FIG. 13, an example of a trigger frame, TF1, according to an embodiment of the present disclosure is shown. In the case of FIG. 13, to trigger the first to third receiving devices HE STA, EHT STA, and EHT+ STA with one PPDU, the transmitting device AP may use the trigger frame TF1 in the form of an Aggregated-MAC Protocol Data Unit (A-MPDU). In this case, although not shown in the drawing, the characteristics (e.g., a "UL BW" subfield capable of indicating 320 MHz) of the next-generation standards (802.11be and 802.11be+ standards) described with reference to FIGS. 5 to 11 may be reflected in a second trigger frame Trigger Frame 2 and a third trigger frame Trigger Frame 3. Hereinafter, a detailed description of this case will be discussed as an example.

For instance, the trigger frame TF1 may be included in a data field of a PPDU payload. Further, the trigger frame TF1 may include different first, second and third trigger frames Trigger Frame 1, Trigger Frame 2, and Trigger Frame 3, respectively, aggregated in the form of an Aggregated-MAC Protocol Data Unit (A-MPDU).

Trigger Frame 1 may trigger uplink transmission of the first receiving device HE STA, and Trigger Frame 2 may trigger uplink transmission of the second receiving device ETH STA. Trigger Frame 3 may trigger uplink transmission of the third receiving device EHT+ STA.

Here, Trigger Frame 1 includes a first medium access control (MAC) header, a first frame body, and a first FCS field; Trigger Frame 2 may include a second MAC header, a second frame body, and a second FCS field; and Trigger Frame 3 may include a third MAC header, a third frame body, and a third FCS field.

In addition, the value of the trigger type subfield (i.e., the 'Trigger Type' subfield of FIG. 6) in the common information field of the first frame body (i.e., Common Info of FIG. 5) may be different from the value of the trigger type subfield in the common information field of each of the second and third frame bodies.

For example, values of the trigger type subfields of each of the second and third frame bodies may be assigned in various ways, and there may be exemplary assignment methods as follows.

For example, based on the fact that the trigger type subfield consists of 4 bits, among the 4 bits, 1 bit of the Most Significant Bit (MSB) may be used to indicate each standard (EHT standard and EHT+ standard). That is, when the trigger frame type is 'HE Basic', 4 bits may be '0000', and when the trigger frame type is 'EHT+ Basic', 4 bits may be '1000'.

In addition, for example, specific values among the values of the trigger type subfield may be used to indicate each standard (EHT standard and EHT+ standard). That is, in 802.11ax, one (e.g., 8) of the values indicating reserved (i.e., 8 to 15) may be used to indicate that the corresponding trigger frame is a trigger frame supporting the EHT standard. In addition, another one (e.g., 9) of the values (i.e., 8 to 15) indicating reserved in 802.11ax may be used to indicate that the corresponding trigger frame is a trigger frame that supports the EHT+ standard. In this case, '10 to 15' of the values of the 'Trigger Type' subfield of FIG. 7 may be used to indicate reserved.

For example, for convenience of description, in an embodiment of the present disclosure, the second assignment method (i.e., specific values among the values of the trigger type subfields are used to indicate each standard (EHT standard and EHT+ standard)) will be described as an example.

If this second assignment method is used, the value of the trigger type subfield of the second frame body may include a value (e.g., 8) corresponding to any one of values (i.e., a value (e.g., 8 to 15) indicating reserved in 802.11ax) indicated as reserved in the trigger type subfield of the first frame body, and indicate that Trigger Frame 2 is a trigger frame supporting the EHT standard. The value of the trigger type subfield of the third frame body may include a value (for example, 9) corresponding to the other one of the values (i.e., a value indicating reserved in 802.11ax (e.g., 8 to 15)) indicating reserved in the trigger type subfield of the first frame body, and indicate that the third trigger frame Trigger Frame 3 is a trigger frame supporting the EHT+ standard.

For example, Trigger Frames 2 and 3 (respectively supporting EHT and EHT+ standards) may support higher version standards than Trigger Frame 1 (supporting HE standards). Therefore, even if the trigger frame TF1 is received, the HE STA only interprets the trigger type subfield values (e.g., 8 and 9) of the second and third frame bodies as reserved, but may not interpret this as a value indicating a trigger frame supporting the EHT and EHT+ standards, respectively. Accordingly, upon receiving the trigger frame TF1, the HE STA may interpret only Trigger Frame 1 as a trigger frame allocated to itself, and interpret Trigger Frames 2 and 3 as invalid.

Thus, when the value of the trigger type subfield of the second frame body is 8, the HE STA may interpret the value (i.e., 8) as reserved, and the EHT+ STA may interpret the corresponding value (i.e., 8) as reserved or as a trigger frame supporting the EHT standard. The EHT STA may interpret the corresponding value (i.e., 8) as a trigger frame supporting the EHT standard.

According to the same principle, if the value of the trigger type subfield of the third frame body is 9, the HE STA may interpret the value (i.e., 9) as reserved, and the EHT STA may interpret the corresponding value (i.e., 9) as reserved or as a trigger frame supporting the EHT+ standard. The EHT+ STA may interpret the corresponding value (i.e., 9) as a trigger frame supporting the EHT+ standard.

Therefore, when the transmitting device (e.g., AP) transmits the trigger frame TF1 shown in FIG. 13 to three receiving devices HE STA, EHT STA, and EHT+ STA, each of the receiving devices HE STA, EHT STA, and EHT+ STA may interpret the trigger frame based on the standard supported by each receiving device, and uplink transmit each TB PPDU to the AP.

In other examples, the trigger frame TF1 may alternatively be configured in other ways. For instance, separate subfields (e.g., protocol subfield) for dividing the EHT standard and the EHT+ standard may be added in the common information field of each of Trigger Frame 2 and 3. In addition, 0 for the EHT standard or 1 for the EHT+ standard may be assigned to the corresponding subfield (i.e., a protocol subfield).

For example, when the value of 'protocol subfield' in the common information field of Trigger Frame 2 is 0, this value (i.e., 0) may indicate that Trigger Frame 2 is a trigger frame supporting the EHT standard. On the other hand, when the value of 'protocol subfield' in the common information field of Trigger Frame 2 is 1, the corresponding value (i.e., 1) may indicate that Trigger Frame 2 is a trigger frame supporting the EHT+ standard.

In some embodiments, even in this case, the value of the trigger type subfield in the common information field of the first frame body may be different from the value of the trigger type subfield in the common information field of each of the second and third frame bodies. In some embodiments, values of the trigger type subfields in the common information field of each of the second and third frame bodies may be the same. That is, the value of the trigger type subfield of each of the second and third frame bodies may include a value (e.g., 8) corresponding to any one of values (i.e., a value indicating reserved in the trigger type subfield of the first frame body (e.g., 8 to 15)) indicating reserved in the trigger type subfield of the first frame body.

Thus, when the value of the trigger type subfield of the second frame body is 8 and the value of the protocol subfield is 0, the HE STA may interpret the value (i.e., 8) of the trigger type subfield as reserved. In addition, both the EHT+ STA and the EHT STA may interpret a combination of the value (i.e., 8) of the trigger type subfield and the value (i.e., 0) of the protocol subfield as a trigger frame supporting the EHT standard.

Based on the same principle, when the value of the trigger type subfield of the third frame body is 8 and the value of the protocol subfield is 1, the HE STA may interpret the value (i.e., 8) of the trigger type subfield as reserved. In addition, both the EHT+ STA and the EHT STA may interpret a combination of the value (i.e., 8) of the trigger type subfield and the value (i.e., 1) of the protocol subfield as a trigger frame supporting the EHT+ standard.

Therefore, when the AP transmits the trigger frame TF1 shown in FIG. 13 to three receiving devices HE STA, EHT STA, and EHT+ STA, each receiving device may perform uplink transmission of each TB PPDU to the AP by interpreting the trigger frame based on the standard supported by each receiving device.

Next, referring to FIG. 14, another example of a trigger frame, TF2, according to an embodiment of the present disclosure is shown. In the case of FIG. 14, to trigger the first to third receiving devices HE STA, EHT STA, and EHT+ STA with one PPDU, this is a case of configuring a trigger frame in the form of Single-MAC Protocol Data Unit (S-MPDU) by expanding the common information field and the user information field using the value of the 'AID12' subfield indicating reserved. That is, to indicate the common information field and the user information field for the second and third receiving devices EHT STA and EHT+ STA, respectively, specific values (e.g., a value indicating reserved) among values of the 'AID12' subfield may be used. Also, in a different way, the common information field and the user information field for the second and third receiving devices EHT STA and EHT+ STA may each include a protocol subfield, and hereinafter, detailed contents thereof will be described.

For example, the trigger frame TF2 may be included in a payload (i.e., a data field of a payload) of a PPDU. In addition, the trigger frame TF2 may include a trigger frame in the form of a Single-MAC Protocol Data Unit (S-MPDU).

For example, the trigger frame TF2 may trigger uplink transmission of the first to third receiving devices HE STA, EHT STA, and EHT+ STA.

Here, the trigger frame TF2 may include a MAC header, a frame body, and an FCS field.

In particular, the frame body may include a common information field, a plurality of user information fields (e.g., UIF1 to UIF5), and a padding field.

For example, the common information field Common Info may include common control information applied to the first receiving device HE STA. In addition, the first user information field UIF1 among the plurality of user information fields UIF1 to UIF5 may include user specific control information (User Info) applied to the first receiving device HE STA. In addition, among the plurality of user information fields UIF1 to UIF5, the second and third user information fields UIF2 and UIF3 may be used as a common information field (i.e., EHT Common Info) and a user information field (i.e., EHT User Info) applied to the second receiving device EHT STA, respectively. In addition, among the plurality of user information fields UIF1 to UIF5, the fourth and fifth user information fields UIF4 and UIF5 may be used as a common information field (i.e., EHT+ Common Info) and a user information field (i.e., EHT+ User Info) applied to the third receiving device EHT+ STA, respectively.

For example, the order of the common information field (i.e., EHT Common Info) and the user information field (i.e., EHT User Info) applied to the second receiving device EHT STA, and the common information field (i.e., EHT+ Common Info) and the user information field (i.e., EHT+ User Info) applied to the third receiving device EHT+ STA may be changed. However, for convenience of explanation, the order illustrated in FIG. 14 will be described as an example.

Moreover, while FIG. 14 shows that five user information fields are configured, other examples employ more or fewer user information fields Thus, when there are additional receiving devices other than the three receiving devices, user information fields for each additional receiving device may further exist. As an example to explain principles of the inventive concept, a case of five user information fields will be described.

The value of the identifier subfield in the second user information field UIF2 includes a value (e.g., 2008) corresponding to any one of values (e.g., 2008 to 2044 and 2047 to 4094 in FIG. 10) indicating reserved in the identifier subfield (i.e., means the 'AID12' subfield of FIG. 9) in the first user information field UIF1, and may indicate that the second user information field UIF2 includes a common information field (i.e., EHT common Info) applied to the second receiving device EHT STA.

Here, the second user information field UIF2 is configured in an existing user information field format (i.e., the user information field format of the 802.11ax trigger frame), and the length of the second user information field UIF2 may be the same as the length of the existing user information field. Accordingly, the second user information field UIF2 is composed of 40 bits (i.e., 5 bytes), and 12 bits of the second user information field UIF2 may constitute an identifier subfield, and the remaining 28 bits of the second user information field UIF2 may constitute a common information field (i.e., EHT Common Info) applied to the second receiving device EHT STA.

However, when the remaining 28 bits of the second user information field UIF2 are less than the number of bits required to include the common information field applied to the second receiving device EHT STA, an extra user information field (not shown) among the plurality of user information fields may be used as a common information field applied to the second receiving device EHT STA in addition to the second user information field UIF2.

For example, the second user information field UIF2 and the extra user information field (not shown) are each composed of 40 bits, and 12 bits of each of the second user information field UIF2 and the extra user information field may individually include an identifier subfield having the same value (e.g., 2008). In addition, the remaining 28 bits of each of the second user information field UIF2 and the extra user information field may be configured by dividing a common information field applied to the second receiving device EHT STA.

For example, in the drawings, for convenience of description, the second user information field UIF2 is displayed without being divided into a 12-bit identifier subfield and a 28-bit common information field.

Subsequently, the value of the identifier subfield in the third user information field UIF3 includes a value corresponding to any one (e.g., 2010, which is an unused value in the second user information field UIF2) of values (e.g., 2008 to 2044, and 2047 to 4094 in FIG. 10) indicating reserved in the identifier subfield in the first user information field UIF1, and may indicate that the third user information field UIF3 includes a user information field (i.e., EHT User Info) applied to the second receiving device EHT STA.

Here, the third user information field UIF3 is also configured in the existing user information field format (i.e., the user information field format of the 802.11ax trigger frame), and the length of the third user information field UIF3 may be the same as the length of the existing user information field. Accordingly, the third user information field UIF3 may consist of 40 bits (i.e., 5 bytes). And, as shown in FIG. 15, the first 12 bits of the third user information field UIF3 may constitute a first identifier subfield, the next 12 bits of the third user information field UIF3 may constitute a second identifier subfield, and the remaining 16 bits of the third user information field UIF3 may constitute a user information field (i.e., EHT User Info of FIG. 14) applied to the second receiving device EHT STA.

More specifically, the first identifier subfield (i.e., AID 2010) may be an identifier subfield for indicating that the third user information field UIF3 includes a user information field (i.e., EHT User Info) applied to the second receiving device EHT STA. In addition, the second identifier subfield (i.e., (EHT)AID) may be an identifier subfield for indicating the identifier of the actual second receiving device EHT STA.

However, if the remaining 16 bits of the third user information field UIF3 are less than the number of bits required to include the user information field applied to the second receiving device EHT STA, an extra user information field (not shown) among the plurality of user information fields may be used as a user information field applied to the second receiving device EHT STA in addition to the third user information field UIF3.

For example, the third user information field UIF3 and the extra user information field (not shown) each consist of 40 bits, and the first 12 bits of each of the third user information field UIF3 and the extra user information field may individually configure a first identifier subfield having the same value (e.g., 2010). And, the next 12 bits of each of the third user information field UIF3 and the extra user information field (not shown) may include a second identifier subfield having the same value, and the remaining 16 bits of each of the third user information field UIF3 and the extra user information field (not shown) may be configured by dividing the user information field applied to the second receiving device EHT STA.

The first identifier subfield of each of the third user information field UIF3 and the extra user information field (not shown) may indicate that the third user information field UIF3 and the extra user information field each include a user information field applied to the second receiving device EHT STA. In addition, the second identifier subfield of each of the third user information field UIF3 and the extra user information field may indicate an identifier of an actual second receiving device EHT STA.

For example, in FIG. 14, for convenience of description, the third user information field UIF3 is not displayed as shown in FIG. 15.

Meanwhile, the fourth user information field UIF4 is configured in the same manner as the second user information field UIF2 described above and is used as a common information field (i.e., EHT+ Common Info) applied to a third receiving device EHT+ STA. The value of the identifier subfield of the fourth user information field UIF4 may include a value (e.g., 2012) different from the value used in the second and third user information fields UIF2 and UIF3) among values (e.g., 2008 to 2044, and 2047 to 4094 in FIG. 10) indicating reserved in the identifier subfield in the first user information field UIF1 and indicate that the fourth user information field UIF4 includes a common information field (i.e., EHT+ Common Info) applied to the third receiving device EHT+ STA.

In addition, the fifth user information field UIF5 may be configured in the same manner as the third user information field UIF3 described above and used as a user information field (i.e., EHT+ User Info) applied to a third receiving device EHT+ STA. The value of the identifier subfield of the fifth user information field UIF5 may include a value (e.g., 2014) different from the value used in the second to fourth user information fields UIF2 to UIF4 among values indicating reserved in the identifier subfield in the first user information field UIF1 (e.g., 2008 to 2044, and 2047 to 4094 in FIG. 10) and indicate that the fifth user information field UIF5 includes a user information field (i.e., EHT+ User Info) applied to the third receiving device EHT+ STA.

As described above, since the trigger frame TF2 of FIG. 14 is configured, the HE STA has to interpret the second to fifth user information fields UIF2 to UIF5 as the 802.11ax standard. Therefore, even if the HE STA receives the trigger frame TF2, the identifier subfield values (e.g., 2008, 2010, 2012, and 2014) of the second to fifth user information fields UIF2 to UIF5 are only interpreted as reserved, and this cannot be interpreted as an identifier indicating common information fields and user information fields applied to the second and third receiving devices EHT STA and EHT+ STA, respectively. Accordingly, upon receiving the trigger frame TF2, the HE STA may interpret the common information field Common Info and the first user information field UIF1 following the MAC Header as fields related to itself, and interpret the second to fifth user information fields UIF2 to UIF5 as reserved.

Thus, for example, if the value of the identifier subfield in the user information field is 2008, the HE STA may interpret the value (i.e. 2008) as reserved, and the EHT+ STA may interpret the corresponding value (i.e., 2008) as reserved or as an identifier indicating a common information field for the EHT STA. The EHT STA may interpret the value (i.e., 2008) as an identifier indicating the common information field for the EHT STA.

In the same manner, for example, if the value of the identifier subfield in the user information field is 2012, the HE STA may interpret the value (i.e. 2012) as reserved, and the EHT STA may interpret the corresponding value (i.e., 2012) as reserved or as an identifier indicating a common information field for the EHT+ STA. The EHT+ STA may interpret the corresponding value (i.e., 2012) as an identifier indicating the common information field for the EHT+ STA.

With the same principle, for example, if the value of the identifier subfield in the user information field is 2010, the HE STA may interpret the value (i.e. 2010) as reserved, and the EHT+ STA may interpret the corresponding value (i.e., 2010) as reserved or as an identifier indicating the user information field for the EHT STA. It is noted that the EHT STA may interpret the corresponding value (i.e., 2010) as an identifier indicating the user information field for the EHT STA.

In the same manner, for example, if the value of the identifier subfield in the user information field is 2014, the HE STA may interpret the value (i.e. 2014) as reserved, and the EHT STA may interpret the corresponding value (i.e., 2014) as reserved or as an identifier indicating a user information field for the EHT+ STA. The EHT+ STA may interpret the corresponding value (i.e., 2014) as an identifier indicating the user information field for the EHT+ STA.

Therefore, when the AP transmits the trigger frame TF2 shown in FIG. 14 to three receiving devices HE STA, EHT STA, and EHT+ STA, each of the receiving devices HE STA, EHT STA, and EHT+ STA may interpret the value of the identifier subfield based on the standard supported by each receiving device and uplink transmit each TB PPDU to the AP.

In other examples, the trigger frame TF2 may be configured in other ways. For instance, when the value of the identifier subfield in a specific user information field among a plurality of user information fields is any one (e.g., 2008) of values (i.e., 2008 to 2044, and 2047 to 4094) indicating reserved in 802.11ax, the trigger frame TF2 may be configured so that both the second and third receiving devices EHT STA and EHT+ STA interpret a corresponding specific user information field as their own common information field. That is, any one of the values of the identifier subfield (e.g., 2008) may be commonly used as a value indicating a common information field to the receiving devices (e.g., EHT STA and EHT+ STA) supporting different standards.

In addition, a separate subfield (e.g., a protocol subfield) that separates the EHT standard and the EHT+ standard may be added in the specific user information field. In addition, 0 for the EHT standard or 1 for the EHT+ standard may be assigned to the corresponding subfield (i.e., a protocol subfield).

For example, when the value of the protocol subfield in the specific user information field is 0, the corresponding value (i.e., 0) may indicate that the corresponding specific user information field is used as a common information field for the EHT STA. On the other hand, when the value of the protocol subfield in the specific user information field is 1, the corresponding value (i.e., 1) may indicate that the corresponding specific user information field is used as a common information field for the EHT+ STA.

Thus, if the value of the identifier subfield in the user information field is 2008 and the value of the protocol subfield is 0, the HE STA may interpret the value (i.e., 2008) of the identifier subfield as reserved. In addition, both the EHT+ STA and the EHT STA may interpret the combination of the value (i.e., 2008) of the identifier subfield and the value (i.e., 0) of the protocol subfield as a combination indicating the common information field for the EHT STA.

Analogously, if the value of the identifier subfield in the specific user information field is 2008 and the value of the protocol subfield is 1, the HE STA may interpret the value (i.e., 2008) of the identifier subfield as reserved. In addition, both the EHT+ STA and the EHT STA may interpret the combination of the value (i.e., 2008) of the identifier subfield and the value (i.e., 1) of the protocol subfield as a combination indicating the common information field for the EHT+ STA.

Also on the same principle, if the value of the identifier subfield in the specific user information field is 2010 and the value of the protocol subfield is 0, the HE STA may interpret the value (i.e., 2010) of the identifier subfield as reserved. In addition, both the EHT+ STA and the EHT STA may interpret the combination of the value (i.e., 2010) of the identifier subfield and the value (i.e., 0) of the protocol subfield as a combination indicating the user information field for the EHT STA.

In the same manner, if the value of the identifier subfield in the specific user information field is 2010 and the value of the protocol subfield is 1, the HE STA may interpret the value (i.e., 2010) of the identifier subfield as reserved. In addition, both the EHT+ STA and the EHT STA may interpret the combination of the value (i.e., 2010) of the identifier subfield and the value (i.e., 1) of the protocol subfield as a combination indicating the user information field for the EHT+ STA.

Therefore, when the AP transmits the trigger frame TF2 shown in FIG. 14 to three receiving devices HE STA, EHT STA, and EHT+ STA, each of the receiving devices HE STA, EHT STA, and EHT+ STA may interpret the value of the identifier subfield and the value of the protocol subfield based on the standard supported by each receiving device and uplink transmit each TB PPDU to the AP.

For example, the EHT STA and the EHT+ STA may interpret the common information field Common Info (i.e., the 802.11ax standard common information field) of FIG. 14. Accordingly, in order to reduce the number of bits required for the EHT STA common information field (i.e., EHT Common Info) and the EHT+ STA common information field (i.e., EHT+ Common Info), the EHT STA common information field (i.e., EHT Common Info) and the EHT+ STA common information field (i.e., EHT+ Common Info) may be used in combination with the HE STA common information field Common Info, respectively.

For example, the 'More TF' subfield of FIG. 6 may not be included in the EHT STA common information field (i.e., EHT Common Info) and the EHT+ STA common information field (i.e., EHT+ Common Info), respectively. Instead, the EHT STA and the EHT+ STA may use the "More TF" subfield of the common information field Common Info for HE STA as their "More TF" subfield.

The combination method described above may be modified in other examples. For instance, the EHT STA common information field (i.e., EHT Common Info) and the EHT+ STA common information field (i.e., EHT+ Common Info) may be used in combination with the HE STA common information field Common Info in various ways.

Next, referring to FIG. 16, another example TF3 of a trigger frame according to an embodiment of the present disclosure is shown.

In the case of FIG. 16, in order to trigger the first to third receiving devices HE STA, EHT STA, and EHT+ STA with one PPDU, this is a case of configuring a trigger frame in the form of Single-MAC Protocol Data Unit (S-MPDU) by expanding the common information field and user information field using '4095' among the values of the 'AID12' subfield. That is, in order to indicate the existence of the common information field and the user information field for the second and third receiving devices EHT STA and EHT+

STA, among the values of the 'AID12' subfield, 4095 (that is, a value indicating the 'Start of padding field' in 802.11ax) may be used. Also, in a different way, the common information field and the user information field for the second and third receiving devices EHT STA and EHT+ STA may each include a protocol subfield, and hereinafter, detailed contents thereof will be described.

For example, the trigger frame TF3 may be included in a payload (i.e., a data field of a payload) of a PPDU. In addition, the trigger frame TF3 may include a trigger frame in the form of a Single-MAC Protocol Data Unit (S-MPDU).

For example, the trigger frame TF3 may trigger uplink transmission of the first to third receiving devices HE STA, EHT STA, and EHT+ STA.

Here, the trigger frame TF3 may include a MAC header, a frame body, and an FCS field.

In particular, the frame body may include a plurality of common information fields Common Info, EHT Common Info, and EHT+ Common Info, a plurality of user information fields (i.e., User Info, EHT User Info, and EHT+ User Info), and a plurality of padding fields (i.e., User Info with AID 4095 (Padding 1) and User Info with AID 4094 (Padding 2)).

For example, the frame body may include a common information field Common Info, a user information field User Info, and a padding field (i.e., Padding 1), which are applied to the first receiving device HE STA, a common information field (i.e., EHT Common Info) and a user information field EHT User Info, which are applied to the second receiving device EHT STA, and a common information field EHT+ Common Info and a user information field EHT+ User Info, which are applied to the third receiving device EHT+ STA. The frame body may further include a padding field (i.e., Padding 2) for second and third receiving devices EHT STA and EHT+ STA in some cases (e.g., when the second and third receiving devices EHT STA and EHT+ STA require a padding field).

The common information field Common Info and the user information field User Info applied to the first receiving device HE STA each may include common control information and user-specific control information applied to the first receiving device HE STA, and may be allocated before the padding field (i.e., Padding 1). In addition, the common information field (i.e., EHT Common Info) and the user information field (i.e., EHT User Info) applied to the second receiving device EHT STA each may include common control information and user-specific control information applied to the second receiving device EHT STA. In addition, the common information field (i.e., EHT+ Common Info) and the user information field (i.e., EHT+ User Info) applied to the third receiving device EHT+ STA each may include common control information and user-specific control information applied to the third receiving device EHT+ STA.

In other embodiments, the common information fields (i.e., EHT Common Info and EHT+ Common Info) and user information fields (i.e., EHT User Info and EHT+ User Info) applied to each of the second and third receiving devices EHT STA and EHT+ STA may be allocated after the padding field (i.e., Padding 1). In addition, in other embodiments, the padding field (i.e., Padding 2) for the second and third receiving devices EHT STA and EHT+ STA may be allocated after the user information field (i.e., EHT+ User Info) of the third receiving device EHT+ STA.

For example, the order of the common information field (i.e., EHT Common Info) and the user information field (i.e., EHT User Info) applied to the second receiving device EHT STA, and the common information field (i.e., EHT+ Common Info) and the user information field (i.e., EHT+ User Info) applied to the third receiving device EHT+ STA may be changed. In addition, when there are additional receiving devices other than the above-described first to third receiving devices HE STA, EHT STA, and EHT+ STA, an additional common information field and an additional user information field corresponding to each of the additional receiving devices may be further included in the trigger frame TF3.

However, for convenience of explanation, the order and the number of receiving devices shown in FIG. 16 will be described as an example.

And, the value (i.e., 4095) of the identifier subfield in the padding field (i.e., Padding 1) for the first receiving device HE STA may indicate that the corresponding padding field (i.e., Padding 1) is a padding field for the first receiving device HE STA, and the common information fields (i.e., EHT Common Info and EHT+ Common Info) and the user information fields (i.e., EHT User Info and EHT+ User Info) applied to the second and third receiving devices EHT STA and EHT+ STA, respectively, are assigned after the corresponding padding field (i.e., Padding 1).

Here, the padding field (i.e., Padding 1) for the first receiving device HE STA may be a field configured by using an existing user information field (i.e., one of the user information fields of the 802.11ax trigger frame).

For example, in the common information fields (i.e., EHT Common Info and EHT+ Common Info) and the user information fields (i.e., EHT User Info and EHT+ User Info) respectively applied to the second and third receiving devices EHT STA and EHT+ STA, based on the reserved identifier of FIG. 14 (i.e., the value of the identifier subfield indicating reserved), the method of using the existing user information field may not be applied. Therefore, in the case of the common information fields (i.e., EHT Common Info and EHT+ Common Info) and the user information fields (i.e., EHT User Info and EHT+ User Info) respectively applied to the second and third receiving devices EHT STA and EHT+ STA, the field configuration may be newly redefined without limiting the number of bits.

Further, as described above, in some cases, a padding field (i.e., Padding 2) for the second and third receiving devices EHT STA and EHT+ STA may be added to the frame body. Also, if a padding field (i.e., Padding 2) is added, as the value of the identifier subfield indicating the start of the corresponding padding field (i.e., Padding 2), a value (e.g., 4094) corresponding to any one of values (e.g., 2008 to 2044, and 2047 to 4094) indicating reserved in the identifier subfield in the user information field applied to the first receiving device HE STA may be used.

That is, the value (i.e., 4094) of the identifier subfield in the padding field (i.e., Padding 2) for the second and third receiving devices EHT STA and EHT+ STA may include a value (e.g., 4094) corresponding to any one of values (e.g., 2008 to 2044, and 2047 to 4094) indicating reserved in the identifier subfield in the user information field applied to the first receiving device HE STA, and may indicate that the corresponding padding field (i.e., Padding 2) is a padding field for the second and third receiving devices EHT STA and EHT+ STA.

As described above, the trigger frame TF3 of FIG. 16 is configured, and the HE STA has to interpret the frame body as the 802.11ax standard. Therefore, if the HE STA finds a user information field with a value of 4095 in the identifier subfield while receiving and processing the trigger frame TF3, after the corresponding user information field, a padding field may be interpreted as being allocated, and processing (e.g., decoding) may be stopped. Accordingly, upon receiving the trigger frame TF3, the HE STA may interpret the common information field Common Info and the user information field User Info following the MAC Header as fields related to itself, and may not process the fields allocated after the user information field (i.e., User Info with AID 4095) having the identifier subfield value of 4095.

Thus, if the value of the identifier subfield in the user information field is 4095, the HE STA may interpret that the padding field is allocated after the corresponding value (i.e., 4095), and interpret that after the corresponding value (i.e., 4095), the own common information fields (i.e., EHT Common Info and EHT+ Common Info) and user information fields (i.e., EHT User Info and EHT+ User Info) are allocated.

That is, the common information field and the user information field for the EHT STA and the EHT+ STA may be allocated after the user information field in which the value of the 'AID12' subfield is 4095. Accordingly, the HE STA may not perform a decoding operation on fields after the corresponding user information field (the user information field in which the subfield 'AID12' has a value of 4095). On the other hand, in the case of EHT STA and EHT+ STA, their specific information is assigned to fields after the corresponding user information field (user information field with a value of 4095 in the 'AID12' subfield), and fields after the corresponding user information field may also be decoded.

Furthermore, for example, when the value of the identifier subfield in the user information field is 4094, the EHT STA and the EHT+ STA may interpret that the padding field is allocated after the corresponding value (i.e., 4094).

For example, there may be various methods of the second and third receiving devices EHT STA and EHT+ STA to distinguish the common information field (i.e., EHT Common Info) and the user information field (i.e., EHT User Info) applied to the second receiving device EHT STA from the common information field (i.e., EHT+ Common Info) and the user information field (i.e., EHT+ User Info) applied to the third receiving device EHT+ STA.

For example, as described above with reference to FIGS. 14 and 15, there may be a method of distinguishing 'EHT Common Info and EHT+ Common Info' and 'EHT User Info and EHT+ User Info' using the value of the identifier subfield indicating reserved (e.g., 2008 to 2044, and 2047 to 4094 in FIG. 10) in the 802.11ax standard.

In addition, a method of adding a separate subfield (e.g., a protocol subfield) that distinguishes the EHT standard and the EHT+ standard to each of the fields (i.e., EHT Common Info, EHT User Info, EHT+ Common Info, and EHT+ User Info) may be used.

And when using a method of adding a separate subfield (e.g., a protocol subfield) to each of the fields (i.e., EHT Common Info, EHT User Info, EHT+ Common Info, and EHT+ User Info), a method of using the identifier subfield as an auxiliary may also be used.

The method of distinguishing the common information field (i.e., EHT Common Info) and the user information field (i.e., EHT User Info) applied to the second receiving device EHT STA from the common information field (i.e., EHT+ Common Info) and the user information field (i.e., EHT+ User Info) applied to the third receiving device EHT+ STA is not limited to the above-described methods, and other methods may further exist.

In such a way, when the AP transmits the trigger frame TF3 shown in FIG. 16 to three receiving devices HE STA, EHT STA, and EHT+ STA, each of the receiving device HE STA, EHT STA, and EHT+ STA may interpret the value '4095' of the identifier subfield based on the standard supported by each receiving device and uplink transmit each TB PPDU to the AP.

For example, the EHT STA and the EHT+ STA may interpret the common information field Common Info (i.e., the 802.11ax standard common information field) of FIG. 16. Accordingly, in order to reduce the number of bits required for the common information field (i.e., EHT Common Info) for EHT STA and the common information field (i.e., EHT+ Common Info) for EHT+ STA, the common information field (i.e., EHT Common Info) for EHT STA and the common information field (i.e., EHT+ Common Info) for EHT+ STA may be used in combination with the HE STA common information field Common Info, respectively.

For example, the 'More TF' subfield of FIG. 6 may not be included in the EHT STA common information field (i.e., EHT Common Info) and the EHT+ STA common information field (i.e., EHT+ Common Info), respectively. Instead, the EHT STA and the EHT+ STA may use the "More TF" subfield of the common information field Common Info for HE STA as their "More TF" subfield.

The combination method is not limited thereto, and the common information field (i.e., EHT Common Info) for EHT STA and the common information field (i.e., EHT+ Common Info) for EHT+ STA may be used in combination with the HE STA common information field Common Info in various ways.

As such, in an embodiment of the present disclosure, a trigger frame for triggering uplink FD A-PPDU transmission is implemented with the above-described configurations, and hereinafter, a wireless communication method in a WLAN system will be described with reference to FIGS. 17 and 18.

Figure 17:
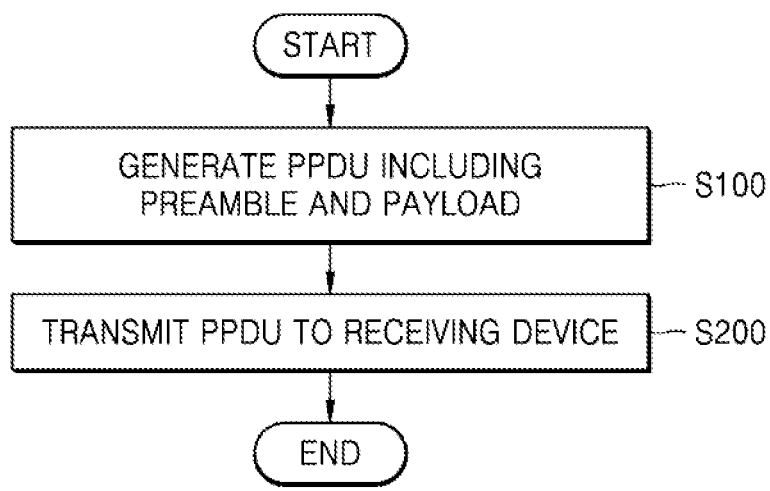
FIG. 17 is a flowchart illustrating a wireless communication method of a transmitting device in a WLAN system according to an embodiment of the present disclosure.

FIG. 17 is a flowchart illustrating a wireless communication method of a transmitting device in a WLAN system. FIG. 18 is a flowchart illustrating a wireless communication method of a receiving device in a WLAN system.

For example, when describing FIGS. 17 and 18, the description will be given with reference to FIG. 3, and FIGS. 17 and 18 will be sequentially described.

Referring to FIGS. 3 and 17, a wireless communication method of a transmitting device in a WLAN system is illustrated. Accordingly, it is assumed that the wireless communication device 200 of FIG. 3 is a transmitting device (e.g., an AP).

First, a PPDU including a preamble and a payload is generated (S100).

For example, the transceiver 260 may generate a PPDU including a preamble and a payload using a trigger frame format, a PPDU format, and RU allocation information stored in the memory 270.

Here, the preamble may include a plurality of training fields and a plurality of signaling fields, and the payload may include a data field and a packet extension.

In addition, the data field may include any one of the trigger frames TF1 to TF3 of FIGS. 13 to 16 described above.

The transceiver 260 may generate a PPDU by configuring a trigger frame according to a trigger frame configuration method (i.e., the method of configuring the trigger frame described above in FIGS. 13 to 16) according to an embodiment of the present disclosure.

When the PPDU is generated (S100), the generated PPDU is transmitted to at least one receiving device (S200).

For example, the transceiver 260 may transmit the generated PPDU to at least one external receiving device (e.g., a STA) through the antenna 280.

Accordingly, at least one external receiving device (e.g., STA) may receive a PPDU from each transmitting device (e.g., AP), and perform uplink transmission of the TB PPDU based on the trigger frame in the received PPDU.

For example, each of the at least one external receiving device may support the same or different standards (e.g., at least one of the HE standard, the EHT standard, and the EHT+ standard). In this case, the PPDU (i.e., the PPDU including any one trigger frame among the above-described trigger frames TF1 to TF3) transmitted from the transmitting device to the receiving device may trigger uplink transmission of an FD A-PPDU composed of a plurality of PPDUs supporting the same or different standards.

Figure 18:
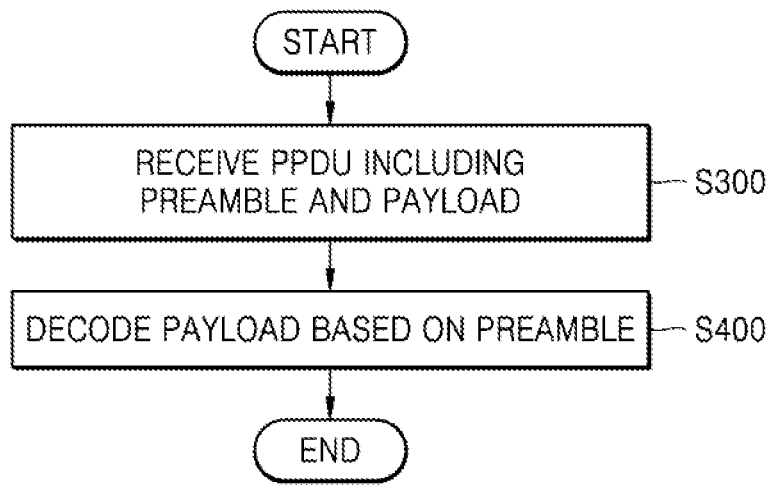
FIG. 18 is a flowchart illustrating a wireless communication method of a receiving device in a WLAN system according to an embodiment of the present disclosure.

Next, referring to FIGS. 3 and 18, a method of wireless communication of a receiving device in a WLAN system is shown. Accordingly, it is assumed that the wireless communication device 200 of FIG. 3 is a receiving device (e.g., a STA).

First, a PPDU including a preamble and a payload is received (S300).

For example, the transceiver 260 may receive a PPDU including a preamble and a payload from an external transmitting device (e.g., AP or STA) through the antenna 280.

Here, the preamble may include a plurality of training fields and a plurality of signaling fields, and the payload may include a data field and a packet extension.

In addition, the data field may include any one of the trigger frames (e.g., TF1 to TF3) of FIGS. 13 to 16 described above. The data field of the PPDU received by the transceiver 260 may include a trigger frame configured according to the trigger frame configuration method (i.e., the trigger frame configuration method described above in FIGS. 13 to 16) according to an embodiment of the present disclosure.

Upon receiving the PPDU (S300), the payload is decoded based on the preamble (S400).

For example, the transceiver 260 may decode the payload based on the preamble of the received PPDU.

Accordingly, the receiving device (e.g., STA) may perform uplink transmission of a TB PPDU of a standard supported by the receiving device (e.g., STA) based on the decoding result.

For example, the receiving device may be one of a plurality of receiving devices (i.e., receiving devices supporting the same or different standards) that receive a PPDU including a trigger frame from the transmitting device. And a plurality of receiving devices are triggered by the PPDU (i.e., a PPDU including any one of the trigger frames TF1 to TF3) so that uplink transmission of an FD A-PPDU composed of a plurality of PPDUs supporting the same or different standards may be performed.

As described above, embodiments of the present disclosure efficiently configure a trigger frame for triggering uplink FD A-PPDU transmission through a device and method for supporting uplink FD A-PPDU transmission in a WLAN system so that it is possible to support backward-compatibility, forward-compatibility, and uplink transmission of an A-PPDU composed of PPDUs of various standards.

Figure 19:
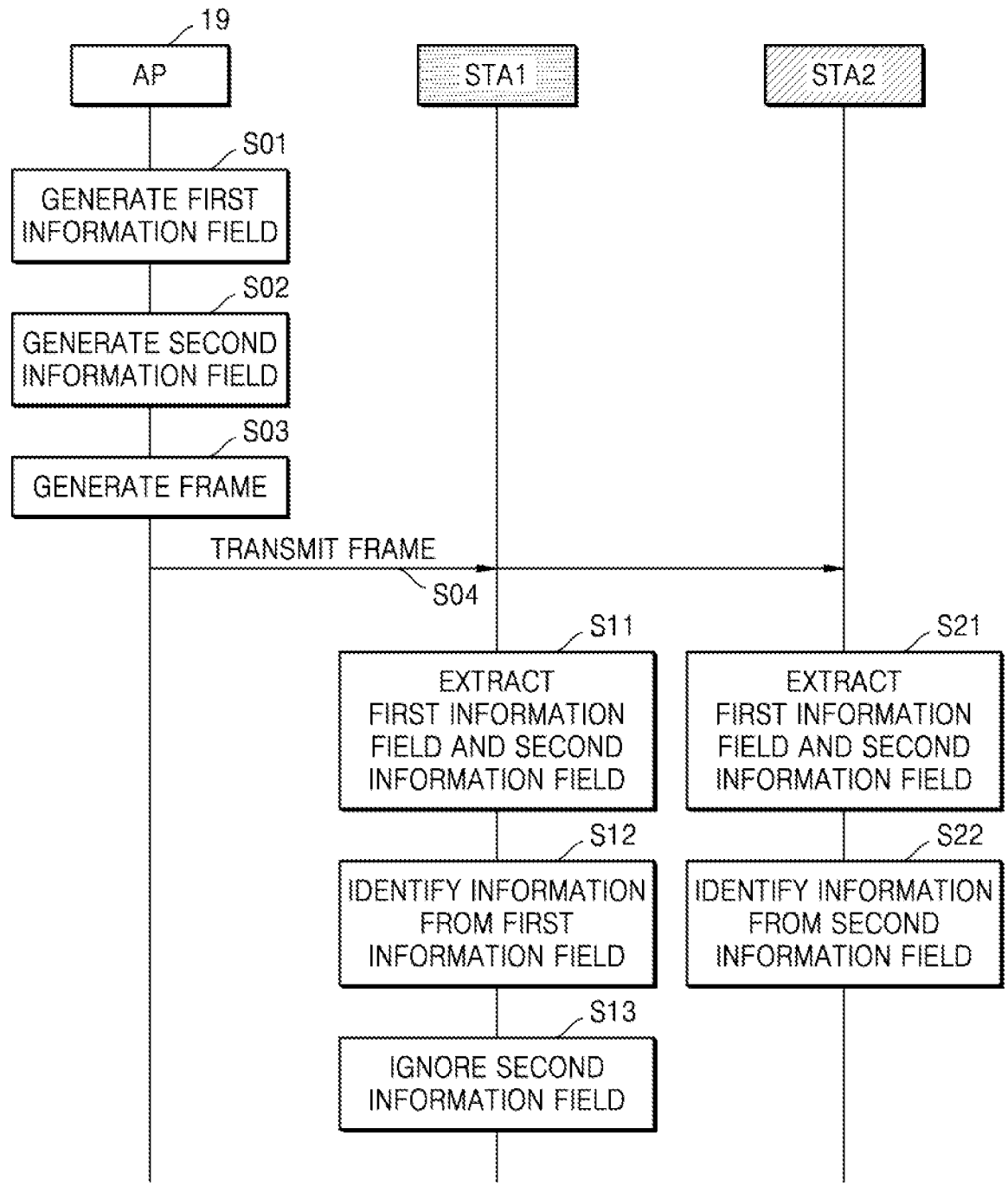
FIG. 19 is a message diagram illustrating a wireless communication method of a WLAN system according to an embodiment of the present disclosure.

FIG. 19 is a signaling diagram illustrating an example wireless communication method of a WLAN system according to an embodiment of the present disclosure. The example of FIG. 19 shows operations of an AP 19 capable of communicating with a legacy device and a non-legacy device, e.g., a first STA STA1, which is a legacy device, and a second STA STA2, which is a non-legacy device. The example wireless communication method includes operations S01 to S04 performed by the AP 19, operations S11 to S13 performed by STA1, and operations S21 to S22 performed by STA2.

The AP 19 may generate a first information field (S01), which includes information to be provided to and identified by STA1. For example, the first information field may include a first value, and STA1 may identify the first information field as valid based on the first value.

The AP 19 may generate a second information field (S02), which includes information to be provided to and identified as valid by STA2, but identifiable as invalid by STA1. For example, the second information field may include a second value, and STA1 may identify the second information field as invalid based on the second value.

The AP 19 may generate a frame including the first information field and the second information field (S03). For example, the AP 19 may generate a frame including a MAC header and a frame body, and a first information field generated at S01 and a second information field generated at S02 may be included in the frame body.

The AP 19 may transmit a frame to STA1 and STA2 (S04). For example, the AP 19 may transmit the PPDU including the frame generated at S03 to STA1 and STA2, and STA1 and STA2 may receive a PPDU in common from the AP 19.

STA1 may extract the first information field and the second information field from the frame (S11). For example, STA1 may extract a frame from the PPDU received from the AP 19, and extract a first information field and a second information field having the same length (i.e., number of bits) from the extracted frame.

STA1 may identify information from the first information field (S12). For example, as described above, the first information field may include a first value, and STA1 may identify the first information field as valid based on the first value, and identify information included in the first information field. As will be described later with reference to FIG. 20, the first information field may include a subfield having a first value, where the first value may be a valid value of a corresponding subfield in a standard (e.g., HE) supported by STA1.

STA1 may ignore the second information field (S13). For example, as described above, the second information field may include a second value, and STA1 may identify the second information field as invalid based on the second value, and may ignore the second information field, that is, information included in the second information field, after having identified the second value. As will be described later with reference to FIG. 20, the second information field may include a subfield having a second value, and the second value may be one of reserved values of a corresponding subfield in a standard (e.g., HE) supported by STA1.

STA2 may extract the first information field and the second information field from the frame (S21). For example, STA2 may extract a frame from the PPDU received from the AP 19, and extract first and second information fields having the same length from the extracted frame.

STA2 may identify information from the second information field (S22). For example, as described above, the second information field may include a second value, and STA2 may identify the second information field as valid based on the second value, and may identify information included in the second information field. As will be described later with reference to FIG. 20, the second information field may include a subfield having a second value, and the second value may be a valid value of a corresponding subfield in a standard (e.g., EHT or EHT+) supported by STA2.

Figure 20:
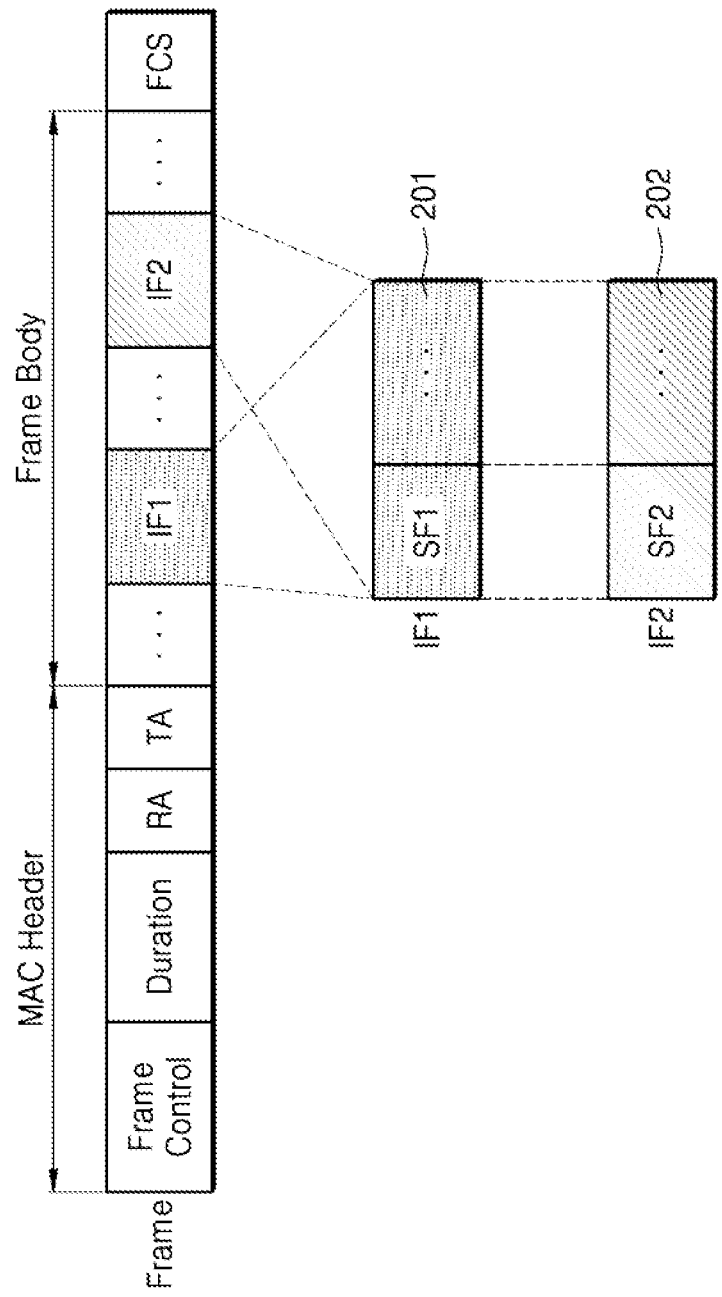
FIG. 20 is a diagram illustrating a frame according to an embodiment of the present disclosure.

FIG. 20 is a diagram illustrating a frame according to an embodiment of the present disclosure. For example, FIG. 20 shows an example of a frame commonly provided by the AP 19 of FIG. 19 to a first STA STA1, which is a legacy device and a second STA STA2, which is a non-legacy device. Hereinafter, FIG. 20 will be described with reference to FIG. 19.

Referring to FIG. 20, a frame may include a MAC header, a frame body, and an FCS. As described above with reference to FIG. 5, the MAC header may include a frame control field, a duration field, an RA field, and a TA field. The frame body may include a first information field IF1 and a second information field IF2. As described above with reference to FIG. 19, IF1 may include information to be provided to a legacy device, e.g., STA1, and IF2 may include information to be provided to a non-legacy device, e.g., STA2. IF1 and IF2 may be included in a frame section (e.g., the user information list field of FIG. 5, or the STA information field section of FIG. 22) in which a variable number of information fields may be arranged.

As shown in FIG. 20, IF1 and IF2 may have the same length (i.e., the number of bits). IF1 may include a first subfield SF1 that has a first value, and IF2 may include a second subfield SF2 that has a second value. As shown in FIG. 20, SF1 and SF2 may also have the same bit index in each of IF1 and IF2 (i.e., SF1 and SF2 may begin at the same position, e.g., the start, of IF1 and IF2, respectively). Accordingly, the legacy STA (STA1) may identify a second value SF2 included in IF2, and ignore IF2 based on the second value.

In some embodiments, IF1 and IF2 may have different respective structures, except for SF1 and SF2. For example, at least one subfield 201 other than SF1 in IF1 may be different from at least one subfield 202 other than the SF2 in IF2 in length and/or bit indexes. Accordingly, the AP 19 and STA2 may use a second information field IF2 having a structure (i.e., a configuration of subfields) designed to include additional information or provide more efficient encoding and/or decoding independently of the legacy STA, STA1. For example, IF2 may have a structure different from IF1 for extended signaling such as extended bandwidth, extended number of spatial streams, etc.

In some embodiments, the frame of FIG. 20 may be the trigger frame described above with reference to FIG. 5, and IF1 and IF2 may be user information fields of a trigger frame. In addition, SF1 and SF2 may each be an 'AID12' subfield of the user information field, and as described above with reference to FIG. 10, the second value of SF2 may be one of reserved values (i.e., 2008 to 2044, and 2047 to 4094) of the 'AID12' subfield. Hereinafter, a null data packet (NDP) announcement frame will be described as an example of the frame of FIG. 20 with reference to FIGS. 21 to 24.

Figure 21:
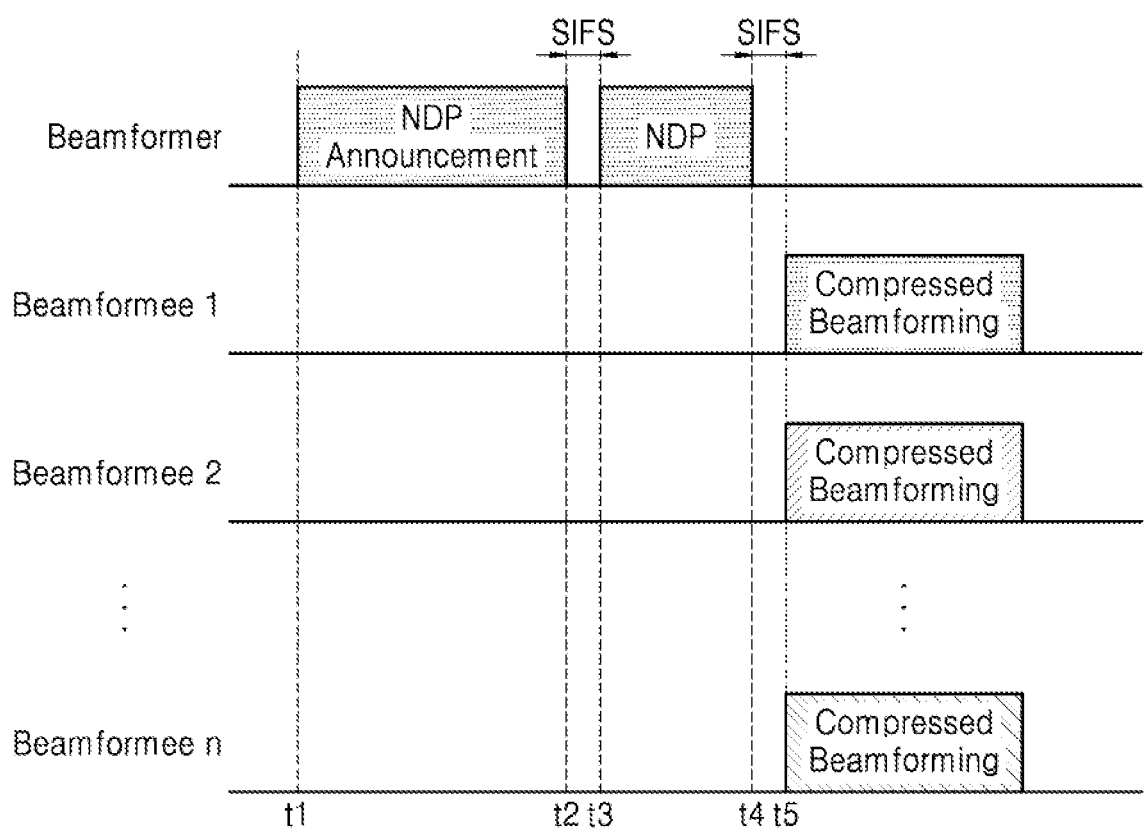
FIG. 21 is a timing diagram illustrating a channel sounding process in a WLAN system.

FIG. 21 is a timing diagram illustrating a channel sounding process in a WLAN system. The timing diagram of FIG. 21 shows an example of a sounding protocol with a plurality of "beamformees", which are receiving devices that receive an antenna beam formed by antenna elements of a "beamformer" (a transmitting device). The beamformer of FIG. 21 may be an AP, and n beamformees may be n STAs (n is an integer greater than 0).

From time t1 to time t2, a beamformer may transmit an NDP announcement frame to beamformees. The NDP announcement frame may correspond to a control frame used to notify the start of channel sounding and a transmission schedule of the NDP frame. The beamformees may prepare feedback of the channel state before receiving the NDP frame based on the NDP announcement frame. An example of the NDP announcement frame will be described later with reference to FIG. 22.

From time t3 to time t4, the beamformer may transmit the NDP frame to the beamformees. For example, as illustrated in FIG. 21, the beamformer may transmit the NDP frame from time t3 after the short interframe space (SIFS) from time t2 when the transmission of the NDP announcement frame is completed. The NDP frame may include training symbols.

From time t5, the beamformees may feed back the channel state to the beamformer. For example, beamformees may generate a feedback matrix by detecting training symbols included in an NDP frame, and may provide a feedback matrix to the beamformer.

Figure 22:
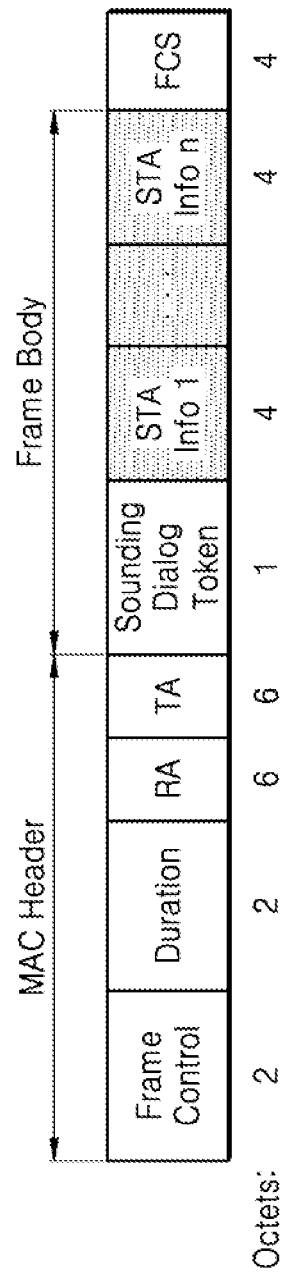
FIG. 22 is a diagram illustrating the structure of an NDP announcement frame defined in 802.11ax.

FIG. 22 is a diagram illustrating the structure of an NDP announcement frame defined in 802.11ax. As described above with reference to FIG. 21, the NDP announcement frame of FIG. 22 may be provided by a beamformer to beamformees during a channel sounding process.

Referring to FIG. 22, an NDP announcement frame may include a MAC header, a frame body, and an FCS field (having 4 or more octets). The MAC header may include a frame control field (2 octets), a duration field (2 octets), an RA field (6 octets), and a TA field (6 octets). The frame body may include a sounding dialog token number (Sounding Dialog Token) field (1 octet) and at least one STA information (STA Info 1, . . . , STA Info n) field (4 octets, respectively). The STA information field may provide information related to channel feedback to the STA (i.e., beamformee). As shown in FIG. 22, the NDP announcement frame may include STA information fields corresponding to the number of STAs, and accordingly, the NDP announcement frame may include a variable number of STA information fields. Examples of the STA information field will be described below with reference to FIGS. 23A and 23B.

Figure 23B:
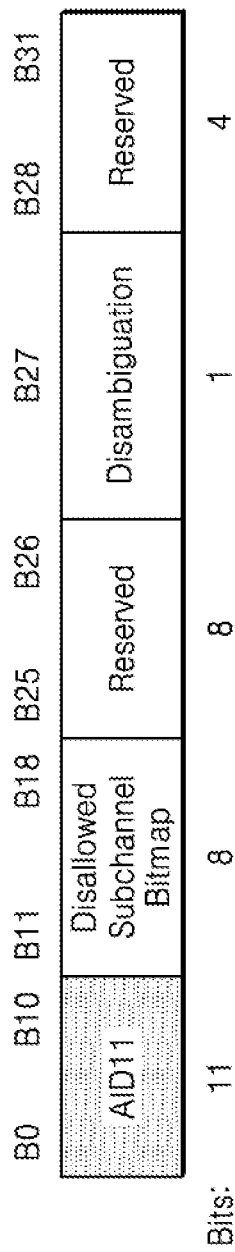

FIGS. 23A and 23B are diagrams illustrating an example structure of the STA information field of FIG. 22. For example, FIG. 23A shows the structure of the STA information field when the value of the 'AID11' subfield included in the STA information field is not 2047, and FIG. 23B shows the structure of the STA information field when the value of the AID subfield included in the STA information field is 2047.

Referring to FIG. 23A, the STA information field may include an AID11 subfield. If the value of the AID11 subfield is not 2047, the STA information field may include a 'Partial BW Info' subfield, a 'Feedback Type And Ng' subfield, a 'Disambiguation' subfield, a 'Codebook Size' subfield, and an 'Nc' subfield. The subfields of FIG. 23A may respectively correspond to subfields defined in the 802.11ax standard, and the STA information field of FIG. 23A may provide channel feedback related information to the STA corresponding to the value of the AID11 subfield.

In addition, referring to FIG. 23B, the STA information field may include an AID subfield. When the value of the AID subfield is 2047, the STA information field may include a 'Disallowed Subchannel Bitmap' subfield and a 'Disambiguation' subfield, and may include reserved bits. The subfields of FIG. 23B may respectively correspond to subfields defined in the 802.11ax standard. The STA information field of FIG. 23B may provide information on a 20 MHz subchannel to be included in a feedback report among a 160 MHz bandwidth, and STAs may commonly identify corresponding information.

As shown in FIGS. 23A and 23B, the AID11 subfield may have a certain length (an 11-bit number) and certain bit indexes (i.e., B0 to B10) in the STA information field. The HE STA may interpret the STA information field of FIG. 23A or the STA information field of FIG. 23B based on the value of the AID subfield.

Similar to the 'AID12' subfield of the trigger frame described above with reference to FIG. 10, the values 2008 to 2046 among the values of the AID11 subfield in the 802.11ax standard may be reserved. Accordingly, the HE STA may identify the STA information field including the AID subfield having one of 2008 to 2046 as invalid. On the other hand, at least one of values 2008 to 2046 of the AID11 subfield in the next-generation standard (e.g., the second value of FIG. 19) may be used. For example, when the value of the AID subfield is 2008, the EHT STA may identify that the STA information field including the corresponding AID subfield includes information for the EHT STA. In some embodiments, when the value of the AID subfield is 2008, the EHT STA may identify that the STA information field including the corresponding AID11 subfield and subsequent STA information fields include information for the EHT STA. In some embodiments, when the value of the AID11 subfield is 2008, the STA information field may have a structure different from those of FIGS. 23A and 23B except for the AID subfield. Accordingly, in the NDP announcement frame including the STA information field, signaling for the EHT STA may be extended while backward compatibility is maintained.

Figure 24:
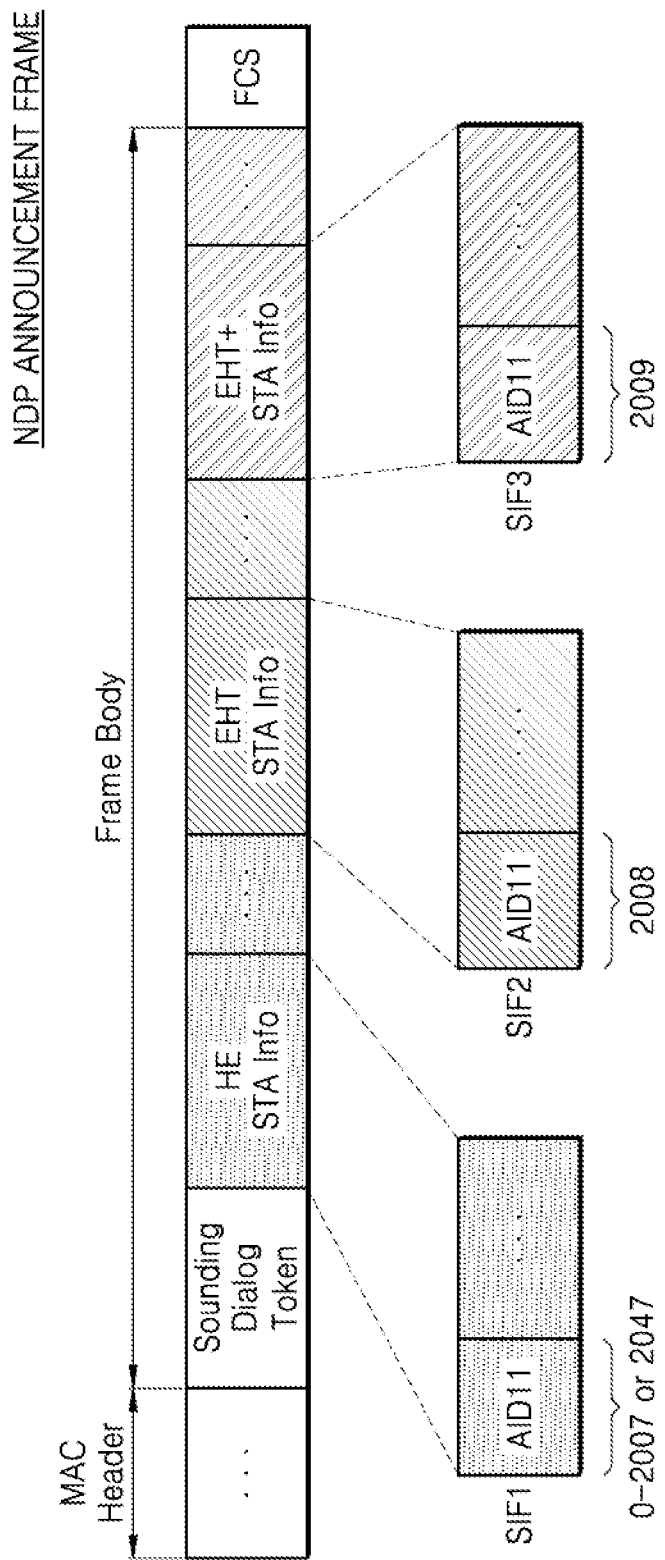
FIG. 24 is a diagram illustrating an NDP announcement frame according to an embodiment of the present disclosure.

FIG. 24 is a diagram illustrating an NDP announcement frame according to an embodiment of the present disclosure. For instance, FIG. 24 shows an example of an NDP announcement frame provided to HE STA, EHT STA, and EHT+ STA.

As shown in FIG. 24, the NDP announcement frame may include a MAC header, a frame body, and FCS, and the frame body may include a sounding dialog token number (Sounding Dialog Token) field, at least one HE STA information (HE STA Info) field, at least one EHT STA information (EHT STA Info) field, and at least one EHT+ STA information (EHT STA+ Info) field. The HE STA information field may include information for an HE STA; the EHT STA information field may include information for an EHT STA; and the EHT+ STA information field may include information for an EHT+ STA. In other embodiments, at least one of the HE STA information field, the EHT STA information field, and the EHT+ STA information field may be omitted.

As described above with reference to FIGS. 23A and 23B, the HE STA information field, the EHT STA information field, and the EHT+ STA information field may each include an AID subfield. For example, as shown in FIG. 24, the AID subfield in each of these information fields may have values other than those of the reserved values of 802.11ax, that is, one of 0 to 2007 and 2047. In addition, as the EHT STA information field, the second STA information field SIF2 may include an AID subfield, where the AID subfield may have one of the reserved values of 802.11ax (e.g., 2008). In addition, as the EHT+ STA information field, the third STA information field SIF3 may include an AID subfield, and the AID subfield may have one of the reserved values of 802.11ax that is not used for the EHT STA in the AID11 subfield, that is, one (e.g., 2009) of the reserved values of 802.11be. Accordingly, the HE STA may ignore the second STA information field SIF2 and the third STA information field SIF3, and the EHT STA may ignore the third STA information field SIF3.

As described above with reference to FIG. 10, the AID11 subfield may have a value predefined as that a common field or a user field is valid for the next generation standard. For example, the value '2008' of the AID11 subfield included in the second STA information field SIF2 may be a value predefined as valid for any next-generation standards (e.g., EHT and EHT+) in the HE. Accordingly, the HE STA may identify that the second information field SIF2 is for a STA supporting the next generation standard, and may ignore the second STA information field SIF2. Similarly, the value '2009' of the AID11 subfield included in the third STA information field SIF3 may be a value predefined as valid for any next-generation standard (i.e., EHT+) in the EHT. Accordingly, the EHT STA may identify that the third information field SIF3 is for a STA supporting the next generation standard, and may ignore the third STA information field SIF3.

Figure 25:
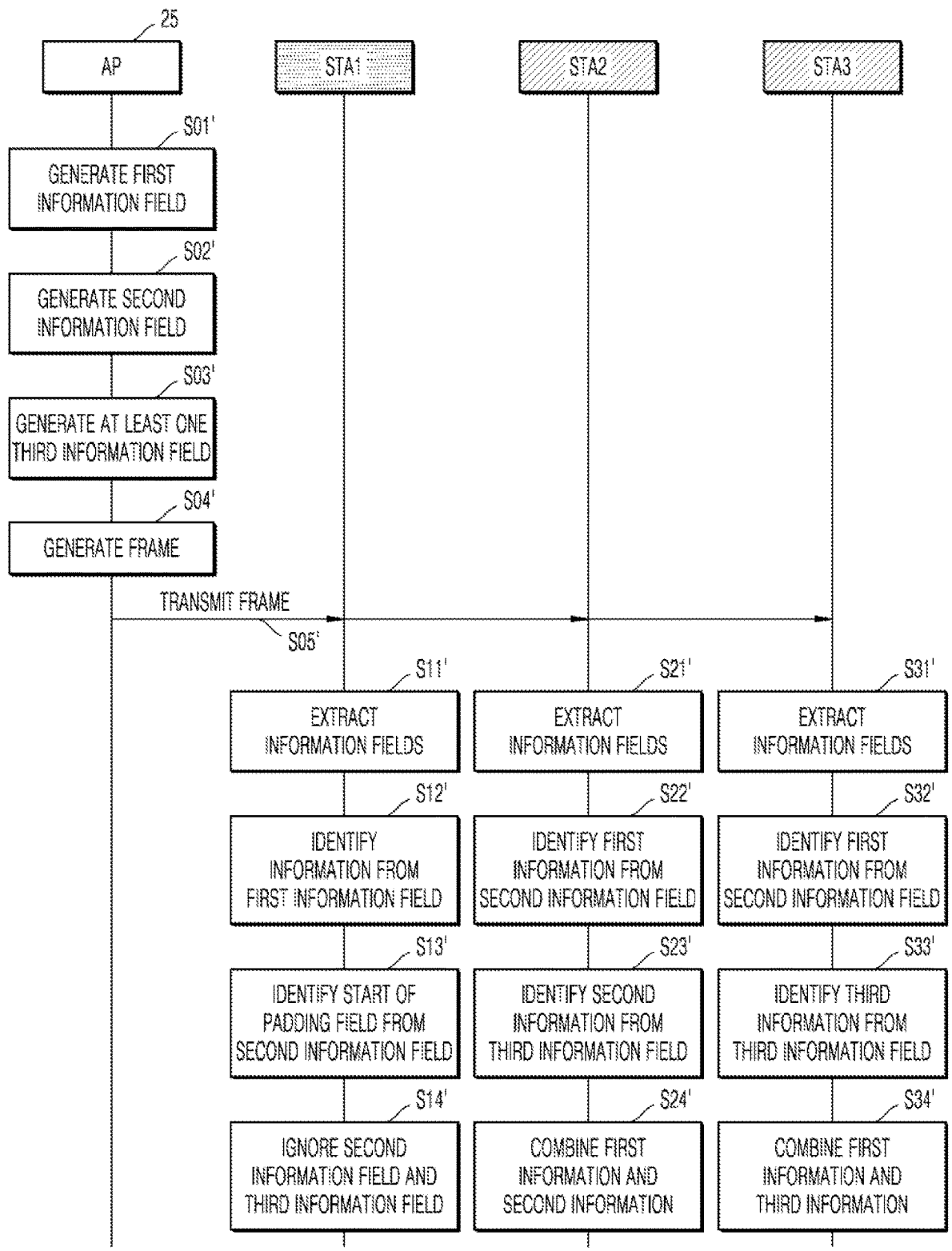
FIG. 25 is a signaling diagram illustrating a wireless communication method of a WLAN system according to an embodiment of the present disclosure.

FIG. 25 is a signaling diagram illustrating a wireless communication method of a WLAN system according to an embodiment of the present disclosure. For example, the message diagram of FIG. 25 shows operations of an AP 25 capable of communicating with a legacy device and a non-legacy device, a first STA STA1 which is a legacy device, and a second STA STA2 and a third STA STA3, which are non-legacy devices. As shown in FIG. 25, the wireless communication method may include operations S01' to S05' performed by the AP 25, operations S11' to S14' performed by STA1, operations S21' to S24' performed by STA2, and operations S31' to S34' performed by STA3.

Referring to FIG. 25, in operation S01', the AP 25 may generate a first information field. The first information field may include information to be provided to STA1, and the AP 25 may generate the first information field to be identified by STA1. For example, the first information field may include a first value, and STA1 may identify the first information field as valid based on the first value.

In operation S02', the AP 25 may generate a second information field. The second information field may include information to be provided to STA2 and STA3, and the AP 25 may generate a second information field to be identified by the second STA STA2 and the third STA STA3 as valid, but to be identified by the first STA STA1 as invalid. For example, the second information field may include a second value, and STA1 may identify the second information field as invalid based on the second value.

In operation S03', the AP 25 may generate at least one third information field. The third information field may correspond to one non-legacy STA, and accordingly, in the example of FIG. 25, the AP 25 may generate two third information fields for STA2 and STA3.

In operation S04', the AP 25 may generate a frame including a first information field, a second information field, and at least one third information field. For example, the AP 25 may generate a frame including a MAC header and a frame body, and the first information field generated in operation S01', the second information field generated in operation S02', and at least one third information field generated in operation S03' may be sequentially arranged in the frame body.

In operation S05', the AP 25 may transmit the frame to STA1, STA2, and STA3. For example, the AP 25 may transmit the PPDU including the frame generated in operation S04' to STA1, STA2, and STA3. STA1, STA2, and STA3 may receive a PPDU in common from the AP 25.

In operation S11', STA1 may extract information fields from the frame. For example, STA1 may extract a frame from the PPDU received from the AP 25, and extract a first information field, a second information field, and at least one third information field having the same length (i.e., the number of bits) from the extracted frame.

In operation S12', STA1 may identify information from the first information field. For example, STA1 may identify the first information field as valid based on a first value included in the first information field, and may identify information included in the first information field. As will be described later with reference to FIG. 25, the first information field may include a subfield having a first value, and the first value may be one of valid values of a corresponding subfield in a standard (e.g., HE) supported by STA1.

In operation S13', STA1 may identify the start of the padding field from the second information field. For example, the second information field may include a subfield having a second value, and the second value may mean the start of the padding field in a standard (e.g., HE) supported by STA1.

In operation S14', STA1 may ignore the second information field and the third information field. For example, STA1 may identify other subfields of the second information field as invalid based on the start of the padding field identified in operation S13', and may identify an information field following the second information field, that is, at least one third information field, as invalid. Accordingly, STA1 may ignore the information field from the second information field to the information field before the FCS field.

In operation S21', STA2 may extract information fields from the frame. For example, STA2 may extract a frame from the PPDU received from the AP 25, and extract a first information field, a second information field, and at least one third information field having the same length (i.e., the number of bits) from the extracted frame.

In operation S22', STA2 may identify first information from the second information field. For example, STA2 may identify the second information field as valid based on the second value included in the second information field, and may identify first information included in the second information field. As will be described later, STA3 may also identify first information from the second information field, and accordingly, the second information field may include common information for non-legacy STAs, that is, the second STA STA2 and the third STA STA3. Also, STA2 may identify that at least one third information field follows the second information field based on a second value included in the second information field.

In operation S23', STA2 may identify the second information from the third information field. For example, STA2 may identify a third information field for itself among third information fields following the second information field, and may identify second information from the identified third information field.

In operation S24', STA2 may combine the first information and the second information. For example, STA2 combines first information, which is common information included in the second information field, and second information, which is personal information included in the third information field to identify information provided by the AP 25.

In operation S31', STA3 may extract information fields from the frame. For example, STA3 may extract a frame from the PPDU received from the AP 25, and extract a first information field, a second information field, and at least one third information field having the same length (i.e., the number of bits) from the extracted frame.

In operation S32', STA3 may identify first information from the second information field. For example, STA3 may identify the second information field as valid based on the second value included in the second information field, and may identify first information included in the second information field. Also, STA3 may identify that at least one third information field follows the second information field based on a second value included in the second information field.

In operation S33', STA3 may identify third information from the third information field. For example, STA3 may identify a third information field for itself among third information fields following the second information field, and may identify third information from the identified third information field.

In operation S34', STA3 may combine the first information and the third information. For example, STA3 combines first information, which is common information included in the second information field, and third information, which is personal information included in the third information field to identify information provided by the AP 25.

In some embodiments, STA2 and STA3 may ignore the first information field. For example, the first value included in the first information field may be one of values representing a legacy standard in a standard (e.g., EHT or EHT+) supported by STA2 and STA3. In some embodiments, the second STA STA2 and the third STA STA3 may identify common information from the first information field. For example, STA2 and STA3 may identify that the first information field includes common information on STA1, STA2, and STA3 based on the first value included in the first information field and may identify common information from the first information field.

Figure 26:
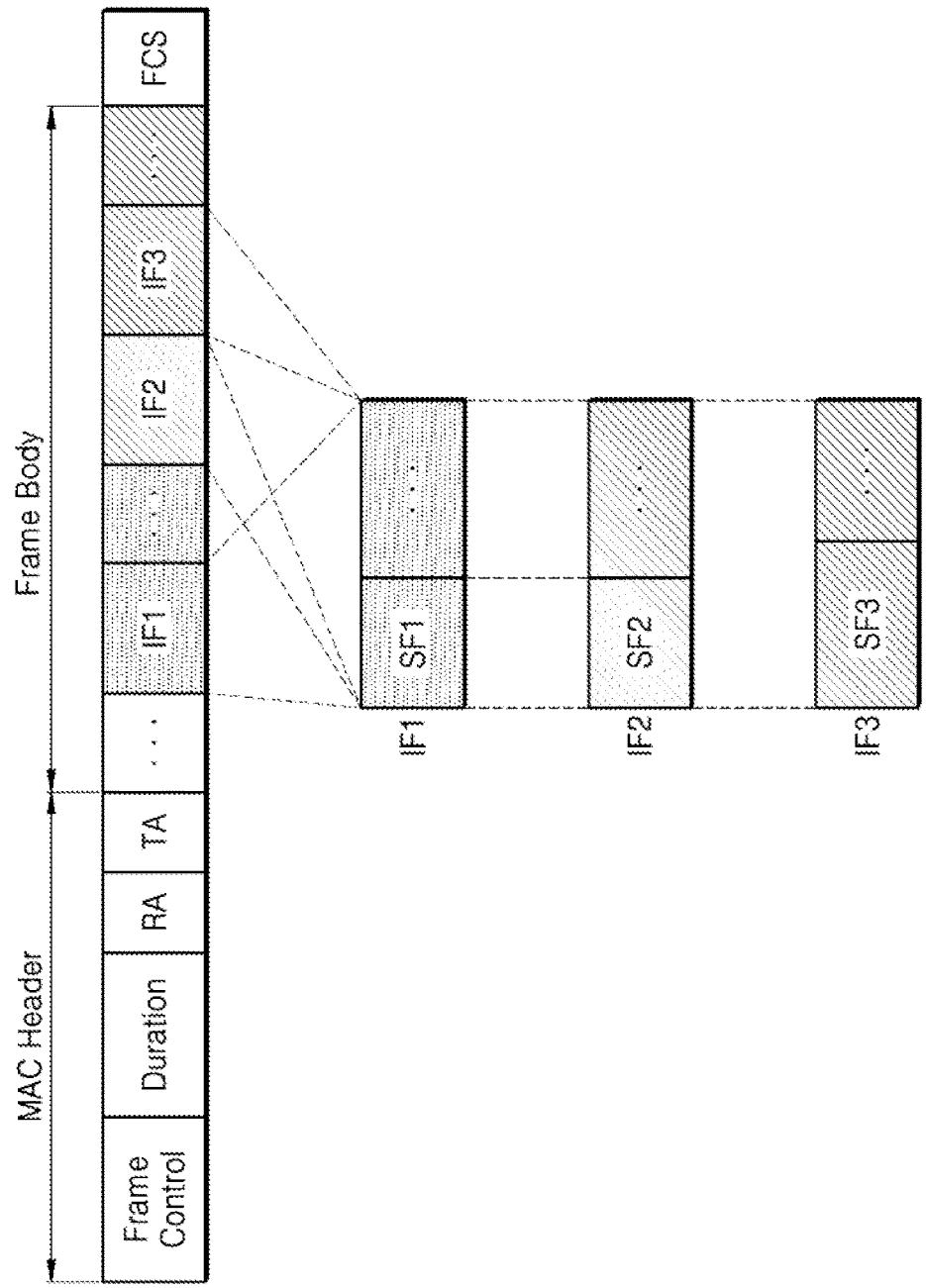
FIG. 26 is a diagram illustrating a frame according to an exemplary embodiment of the present disclosure.

FIG. 26 is a diagram illustrating a frame according to an exemplary embodiment of the present disclosure. For example, FIG. 26 shows an example of a frame commonly provided by the AP 25 of FIG. 25 to STA1, which is a legacy device, and STA2 and STA3, which are the non-legacy devices. Hereinafter, FIG. 26 will be described with reference to FIG. 25.

Referring to FIG. 26, a frame may include a MAC header, a frame body, and an FCS. As described above with reference to FIG. 5, the MAC header may include a frame control field, a duration field, an RA field, and a TA field. The frame body may include a first information field IF1, a second information field IF2, and a third information field IF3. As described above with reference to FIG. 20, the first information field IF1 may include information to be provided to STA1, which is a legacy device, the second information field IF2 may include information to be commonly provided to STA2 and STA3, which are non-legacy devices, and the third information field IF3 may include information to be provided to one of the second STA2 and the third STA3. In some embodiments, the first information field IF1, the second information field IF2, and the third information field IF3 may be included in a section (e.g., the user information list field of FIG. 5, and the STA information field section of FIG. 22) in which a variable number of information fields may be arranged in a frame.

As shown in FIG. 26, the first information field IF1, the second information field IF2, and the third information field IF3 may have the same length (i.e., the number of bits). The first information field IF1 may include a first subfield SF1, and the first subfield SF1 may have a first value. In addition, the second information field IF2 may include a second subfield SF2 and the second subfield SF2 may have a second value. As shown in FIG. 26, the first subfield SF1 and the second subfield SF2 not only have the same length (i.e., the number of bits), but also the same bit index in each of the first information field IF1 and the second information field IF2. Accordingly, the legacy STA, that is, STA1, may identify a second value of the second subfield SF2 included in the second information field IF2, and ignore the second information field IF2 based on the second value.

In some embodiments, the frame of FIG. 20 may be the trigger frame described above with reference to FIG. 5, and the first information field IF1 and the second information field IF2 may be user information fields of a trigger frame. In addition, the first subfield SF1 and the second subfield SF2 may be an 'AID12' subfield of the user information field, and as described above with reference to FIG. 10, the second value of the second subfield SF2 may be 4095 indicating the start of the padding field in the subfield 'AID12'.

In some embodiments, the third information field IF3 may have a structure (e.g., a configuration of subfields) different from the first information field IF1 and the second information field IF2. For example, as shown in FIG. 26, the third information field IF3 may include a third subfield SF3 having a length and/or bit indices different from those of the first subfield SF1 and the second subfield SF2. As described above with reference to FIG. 25, the legacy STA, STA1, may identify the second information field IF2 as the start of the padding field based on the second value of the second subfield SF2 of the second information field IF2, and accordingly, identify the third information field IF3 as invalid regardless of the structure of the third information field IF3 following the second information field IF2. Accordingly, the AP 25, STA2, and STA3 may use the third information field IF3 having a structure that is advantageously defined independently of the legacy STA, that is, STA1.

Figure 27:
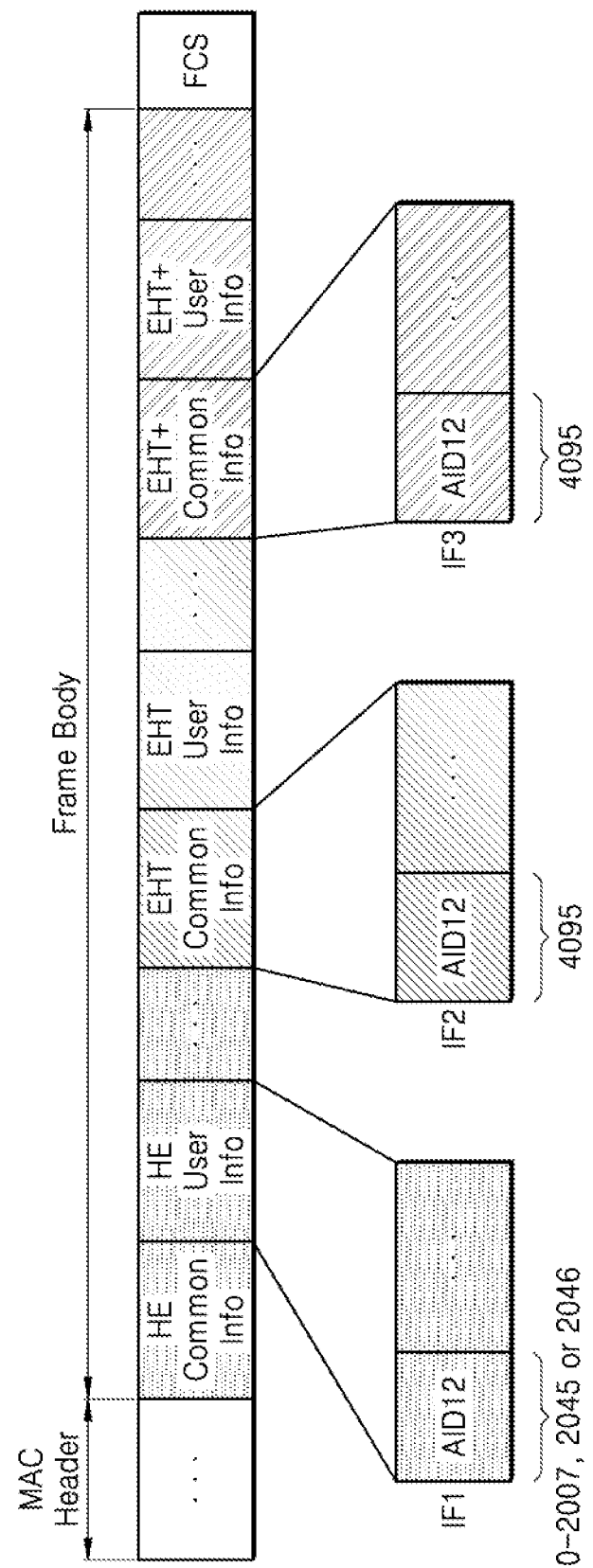
FIG. 27 is a diagram illustrating a trigger frame according to an embodiment of the present disclosure.

FIG. 27 is a diagram illustrating a trigger frame according to an embodiment of the present disclosure. For example, FIG. 27 shows an example of a trigger frame provided to an HE STA, an EHT STA, and an EHT+ STA.

Referring to FIG. 27, the trigger frame may include a MAC header, a frame body, and an FCS, and the frame body may include an HE common information (HE Common Info) field, at least one HE user information (HE User Info) field, an EHT common information (EHT Common Info) field, at least one EHT user information (EHT User Info) field, an EHT+ common information (EHT+ Common Info) field, and at least one EHT+ user information (EHT+ User Info) field. The HE user information field may include information for HE STA, the EHT common information field and the EHT user information field may include information for EHT STA, and the EHT+ common information field and the EHT+ user information field may include information for EHT+ STA. In other embodiments, at least one of the fields included in the frame body of FIG. 27 may be omitted.

The HE user information field, the EHT common information field, and the EHT+ common information field may each include an 'AID12' subfield. For example, as shown in FIG. 27, as the HE user information field, the first information field IF1 may include an 'AID12' subfield, and the 'AID12' subfield may have values other than the reserved values of 802.11ax, that is, one of 0 to 2007, 2045, and 2046. In addition, as the EHT common information field, the second information field IF2 may include an 'AID12' subfield, and the 'AID12' subfield may have a value 4095 indicating the start of the padding field in 802.11ax. Accordingly, the HE STA may ignore information fields between the second information field IF2 and the FCS field. In addition, as the EHT+ common information field, the third information field IF3 may include an 'AID12' subfield, and the 'AID12' subfield may have a value 4095 indicating the start of the padding field in 802.11ax. Accordingly, in other embodiments, the trigger frame includes only information for HE STA and information for EHT+ STA, and even if information for EHT STA is omitted, the HE STA may ignore information fields between the EHT common information field and the FCS field.

In some embodiments, the EHT common information field and the EHT+ common information field may further include an additional subfield (e.g., a protocol subfield) in addition to the 'AID12' subfield. The added subfield may have a value indicating the EHT common information field or the EHT+ common information field, and the EHT STA and the EHT+ STA may identify their own common information field based on the value of the corresponding subfield.

Various functions described hereinabove may be implemented or supported by one or more computer programs and each of the programs is formed of computer-readable program code and is executed in a computer-readable storage medium. "An application" and "a program" refer to one or more computer programs, software components, instruction sets, processes, functions, objects, classes, instances, related data, or parts thereof suitable for implementation of pieces of computer-readable program code. "Computer-readable program code" include all types of computer code including source code, object code, and execution code. "Computer-readable media" include all types media that may be accessed by a computer such as read only memory (ROM), random access memory (RAM), a hard disk drive, a compact disk (CD), a digital video disk (DVD), and other types of memory. "Non-transitory" computer-readable media exclude wired, wireless, optical, or other communication links transmitting temporary electrical or other signals. Non-transitory computer-readable media include a medium in which data may be permanently stored and a medium in which data may be stored and may be overwritten later such as a rewritable optical disk or a deletable memory device.

While embodiments of the inventive concept have been particularly shown and described, it will be understood that various changes in form and details may be made therein without departing from the spirit and scope of the following claims and their equivalents.

What is claimed is:

1. A first receiving device of a Wireless Local Area Network system, the rust receiving device comprising:
   a transceiver configured to receive a protocol data unit including a preamble and a payload from a transmitting device and to decode the payload based on the preamble; and
   a processor configured to control the transceiver,
   wherein a data field of the payload comprises a trigger frame in a Single-Medium Access Control (MAC) Protocol Data Unit (S-MPDU) form,
   wherein the trigger frame comprises a MAC header and a frame body,
   wherein the frame body comprises a rust common information field and a plurality of user information fields,
   wherein the first common information field comprises common control information applied to a second receiving device supporting a second standard different from a first standard supported by the rust receiving device,
   wherein a first user information field among the plurality of user information fields comprises user specific control information applied to the second receiving device, and wherein second and third user information fields among the plurality of user information fields are used as a second common information field containing common information associated with the first standard, and a user information field applied to the rust receiving device, respectively, wherein the first common information field and the tint user information field precede the second and third user information fields in the frame body.

2. The rust receiving device of claim 1, wherein an index of an identifier subfield in the second user information field comprises an index corresponding to any one of indexes indicating reserved in the identifier subfield in the first user information field, and indicates that the second user information field comprises the second common information field applied to the rust receiving device.

3. The rust receiving device of claim 2, wherein the second user information field is composed of 40 bits, wherein 12 bits of the second user information field constitute an identifier subfield, wherein the remaining 28 bits of the second user information field constitute or partially constitute a common information field applied to the first receiving device.

4. The rust receiving device of claim 3, wherein, when the remaining 28 bits of the second user information field are less than a number of bits required to include a common information field applied to the rust receiving device, a fourth user information field among the plurality of user information fields is used as a common information field applied to the rust receiving device in addition to the second user information field.

5. The rust receiving device of claim 4, wherein the second and fourth user information fields each are composed of 40 bits, wherein 12 bits of each of the second and fourth user information fields individually constitute an identifier subfield having the same index, wherein the remaining 28 bits of each of the second and fourth user information fields partially constitute a common information field applied to the first receiving device.

6. The first receiving device of claim 1, wherein an index of an identifier subfield in the third user information field comprises an index corresponding to any one of indexes indicating reserved in the identifier subfield in the first user information field, and indicates that the third user information field comprises a user information field applied to the first receiving device.

7. The first receiving device of claim 6, wherein the third user information field is composed of 40 bits, wherein the first 12 bits of the third user information field constitute a first identifier subfield, wherein the next 12 bits of the third user information field constitute a second identifier subfield, wherein the remaining 16 bits of the third user information field constitute or partially constitute a user information field applied to the rust receiving device.

8. The rust receiving device of claim 7, wherein the rust identifier subfield is an identifier subfield for indicating that the third user information field includes a user information field applied to the first receiving device, wherein the second identifier subfield is an identifier subfield for indicating an identifier of the rust receiving device.

9. The rust receiving device of claim 7, wherein, when the remaining 16 bits of the third user information field are less than a number of bits required to include the user information field applied to the rust receiving device, a further user information field among the plurality of user information fields is used as the user information field applied to the rust receiving device in addition to the third user information field.

10. The rust receiving device of claim 9, wherein the third and further user information fields each are composed of 40 bits, wherein the first 12 bits of each of the third and further user information fields individually constitute a first identifier subfield having the same index, wherein the next 12 bits of each of the third and further user information fields constitute a second identifier subfield having the same index, wherein the remaining 16 bits of each of the third and further user information fields partially constitute the user information field applied to the rust receiving device.

11. The rust receiving device of claim 10, wherein the rust identifier subfield of each of the third and further user information fields is an identifier subfield for indicating that the third and further user information fields each include a user information field applied to the first receiving device, wherein the second identifier subfield of each of the third and further user information fields is an identifier subfield for indicating an identifier of the first receiving device.

12. A first receiving device of a Wireless Local Area Network system, the first receiving device comprising:

a transceiver configured to receive a protocol data unit including a preamble and a payload tom a transmitting device and to decode the payload based on the preamble; and a processor configured to control the transceiver, wherein:

a data field of the payload comprises a trigger frame in a Single-Medium Access Control (MAC) Protocol Data Unit (S-MPDU) form;

the trigger frame comprises a MAC header and a frame body;

the frame body comprise, a first common information field and a plurality of user intonation fields;

the first common information field comprises common control information applied to a second receiving device supporting a second standard different from a first standard supported by the first receiving device;

a first user information field among the plurality of user information fields comprises user specific control information applied to the second receiving device;

second and third user information fields among the plurality of user information fields are used as a second common information field associated with the first standard, and a user information field applied to the first receiving device, respectively;

an index of an identifier subfield in the third user information field comprises an index corresponding to any one of indexes indicating reserved in the identifier subfield in the first user information field, and indicates that the third user information field comprises a user information field applied to the first receiving device;

a value of an identifier subfield in the third user information field corresponds to any one of values indicating reserved in the identifier subfield in the first user information field, and indicates that the third user information field comprises a user information field applied to the first receiving device;

the third user information field is composed of a plurality N of bits;

a rust M bits of the third user information field constitute a first identifier subfield, where M<N;

a next M bits of the third user information field constitute a second identifier subfield;

remaining bits of the third user information field at least partially constitute a user information field applied to the rust receiving device; and when the remaining bits of the third user information field are less than a number of bits required to include the user information field applied to the rust receiving device, a further user information field among the plurality of user information fields is used as the user information field applied to the rust receiving device in addition to the third user information field.

13. A first receiving device of a Wireless Local Area Network system, the rust receiving device comprising:

a transceiver configured to receive a protocol data unit including a preamble and a payload from a transmitting device and to decode the payload based on the preamble; and a processor configured to control the transceiver, wherein a data field of the payload comprises a trigger frame in a Single-Medium Access Control (MAC) Protocol Data Unit (S-MPDU) form, wherein the trigger frame comprises a MAC header and a frame body, wherein the frame body comprises a rust common information field and a plurality of user information fields, wherein the first common information field comprises common control information applied to a second receiving device supporting a second standard different from each of a rust standard or a third standard supported by the first receiving device, wherein a first user information field among the plurality of user information fields comprises user specific control information applied to the second receiving device, and wherein second and third user information fields among the plurality of user information fields are used as a second common information field associated with the rust or third standard, and a user information field applied to the first receiving device, respectively, and the second user information field includes a subfield having a first value when the second common information field is associated with the first standard and having a second value when the second common information field is associated with the third standard.

* * * * *